US011889577B2

(12) United States Patent
Da Silva et al.

(10) Patent No.: US 11,889,577 B2
(45) Date of Patent: *Jan. 30, 2024

(54) METHODS FOR HANDLING PERIODIC RADIO ACCESS NETWORK NOTIFICATION AREA (RNA) UPDATE CONFIGURATION UPON REJECT

(71) Applicant: Telefonaktiebolaget LM Ericsson (publ), Stockholm (SE)

(72) Inventors: Icaro L. J. Da Silva, Solna (SE); Gunnar Mildh, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/095,186

(22) Filed: Jan. 10, 2023

(65) Prior Publication Data

US 2023/0164864 A1    May 25, 2023

Related U.S. Application Data

(60) Continuation of application No. 17/342,750, filed on Jun. 9, 2021, now Pat. No. 11,582,826, which is a
(Continued)

(51) Int. Cl.
*H04W 76/19* (2018.01)
*H04W 76/30* (2018.01)
(Continued)

(52) U.S. Cl.
CPC .......... *H04W 76/19* (2018.02); *H04W 36/08* (2013.01); *H04W 76/27* (2018.02); *H04W 76/30* (2018.02)

(58) Field of Classification Search
CPC ..... H04W 76/19; H04W 76/30; H04W 36/08; H04W 24/10
(Continued)

(56) References Cited

U.S. PATENT DOCUMENTS 8,676,200 B2    3/2014  Yoshihara
10,142,940 B2    11/2018  Ryoo et al.
(Continued)

FOREIGN PATENT DOCUMENTS

CN    107249221 A    10/2017
CN    112088575 A    12/2020
(Continued)

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.1.0, Mar. 2018, 1-268.
(Continued)

*Primary Examiner* — William D Cumming
(74) *Attorney, Agent, or Firm* — Murphy, Bilak & Homiller, PLLC

(57) ABSTRACT

According to an aspect, a user equipment, UE, in a suspended state in a Radio Access Network, RAN, in response to expiration of a first timer, transmits an RRCResumeRequest message. The UE receives a reject message in response to the RRCResumeRequest message. In response to the reject message, the UE starts a second timer and subsequently transmits a further RRCResumeRequest message. The further RRCResumeRequest message is received by the network during a period bounded approximately by the lesser of a duration of the second timer and a period of the periodic UE event and the greater of the duration of the second timer and the period of the periodic UE event.

18 Claims, 19 Drawing Sheets

Related U.S. Application Data division of application No. 16/468,113, filed as application No. PCT/SE2019/050397 on May 6, 2019, now Pat. No. 11,324,063.

(60) Provisional application No. 62/667,815, filed on May 7, 2018.

(51) Int. Cl.
*H04W 76/27* (2018.01)
*H04W 36/08* (2009.01)

(58) Field of Classification Search
USPC .......................................................... 370/329
See application file for complete search history.

(56) References Cited

U.S. PATENT DOCUMENTS

| | | | |
|---|---|---|---|
| 10,531,396 B2 | 1/2020 | Ryoo et al. | |
| 10,834,682 B2 | 11/2020 | Ryoo et al. | |
| 10,873,984 B2 | 12/2020 | Hayashi | |
| 10,932,121 B2 | 2/2021 | Kim et al. | |
| 11,324,063 B2* | 5/2022 | da Silva | H04W 76/19 |
| 11,546,790 B2* | 1/2023 | Jung | H04L 5/0094 |
| 11,582,826 B2* | 2/2023 | Da Silva | H04W 76/19 |
| 2012/0077499 A1 | 3/2012 | Yoshihara | |
| 2013/0201823 A1 | 8/2013 | Gupta | |
| 2018/0220483 A1 | 8/2018 | Hayashi | |
| 2019/0028976 A1 | 1/2019 | Ryoo et al. | |
| 2019/0045564 A1 | 2/2019 | Hayashi | |
| 2019/0141515 A1 | 5/2019 | Kim et al. | |
| 2020/0068499 A1 | 2/2020 | Ryoo et al. | |
| 2020/0260311 A1* | 8/2020 | Jung | H04W 24/10 |
| 2021/0127445 A1* | 4/2021 | da Silva | H04W 76/25 |
| 2021/0298110 A1* | 9/2021 | Da Silva | H04W 76/19 |
| 2022/0053589 A1* | 2/2022 | Zhang | H04W 76/19 |
| 2022/0167451 A1 | 5/2022 | Bergström et al. | |
| 2023/0135437 A1* | 5/2023 | Jung | H04W 76/30 370/329 |
| 2023/0164864 A1* | 5/2023 | Da Silva | H04W 36/08 370/329 |

FOREIGN PATENT DOCUMENTS

| | | | |
|---|---|---|---|
| TW | I484799 B | 5/2015 | |
| WO | 2013024000 A1 | 2/2013 | |
| WO | 2018006253 A1 | 1/2018 | |
| WO | 2018030866 A1 | 2/2018 | |
| WO | 2018057120 A1 | 3/2018 | |
| WO | 2019202455 A1 | 10/2019 | |
| WO | 2019216807 A1 | 11/2019 | |
| WO | WO-2019216807 A1 * | 11/2019 | ............ H04W 36/08 |
| WO | 2020167203 A1 | 8/2020 | |
| WO | WO-2020188447 A1 * | 9/2020 | ........... H04L 5/0053 |

OTHER PUBLICATIONS

3GPP, "3rd Generation Partnership Project; Technical Specification Group Radio Access Network; NR; User Equipment (UE) procedures in Idle mode and RRC Inactive state (Release 15)", 3GPP TS 38.304 v1.0.1, Apr. 2018, pp. 1-21.

3GPP, "3rd Generation Partnership Project; Technical Specification Group Radio Access Network; Study on New Radio Access Technology; Radio Access Architecture and Interfaces (Release 14)", 3GPP TR 38.801 V1.2.0, Feb. 2017, 1-90.

Latheef, Fasil, et al., "On the UE Context Retrieval Enhancements for Improved Inter-RAT Mobility", 2020, 1-6.

Pencheva, Evelina, "Toward Service Based Radio Access Network", IEEE International Conference on Information Technologies (InfoTech), Sep. 2019, 1-4.

Unknown, Author, "CR on Connection Control ([101#37][NR] RRC procedures/messages)", 3GPP TSG-RAN WG2 #101Bis Tdoc R2-180xxxx, Sanya, P.R. of China, Apr. 16-20, 2018, 1-307.

Unknown, Author, "Email discussion report on [98#30][NR] RRC Connection Control", 3GPP TSG RAN WG2 Meeting #99 R2-1708799, Revision R2-1707038, Berlin, Germany, Aug. 21-25, 2017, 1-58.

Unknown, Author, "Email discussion report on [99#29][NR] Connection Control", 3GPP TSG RAN WG2 Meeting #99bis R2-1711839, Prague, Czech Republic, Oct. 9-13, 2017, 1-28.

Unknown, Author, "Periodic RNAU correction", 3GPP TSG-RAN WG2 Meeting #104 R2-1817090, Spokane, USA, Nov. 12-16, 2018, 1-10.

Unknown, Author, "RAN-based notification area update procedure", 3GPP TSG-RAN WG2#101 R2-1801833, Athens, Greece, Feb. 26-Mar. 2, 2018, 1-3.

Unknown, Author, "Resuming after Reject with wait timer", 3GPP TSG-RAN WG2 #102 Tdoc R2-1807922, Busan, Korea, May 21-25, 2018, 1-4.

Unknown, Author, "Summary of agreements on connection control", 3GPP TSG-RAN WG2 #101bis R2-1805352, (Revision of R2-1802361), Sanya, P.R. of China, Apr. 16-20, 2018, 1-16.

Xin, Jincan, et al., "Small Data Transmission in Inactive State", The 13th International Conference on Advanced Infocomm Technology, 2021, 151-155.

Unknown, Author, "RRC connection re-establishment and resume procedures in NR", 3GPP TSG-RAN WG2#101 R2-1801827, Resubmission of R2-1800132, Athens, Greece, Feb. 26-Mar. 2, 2018, 1-7.

* cited by examiner

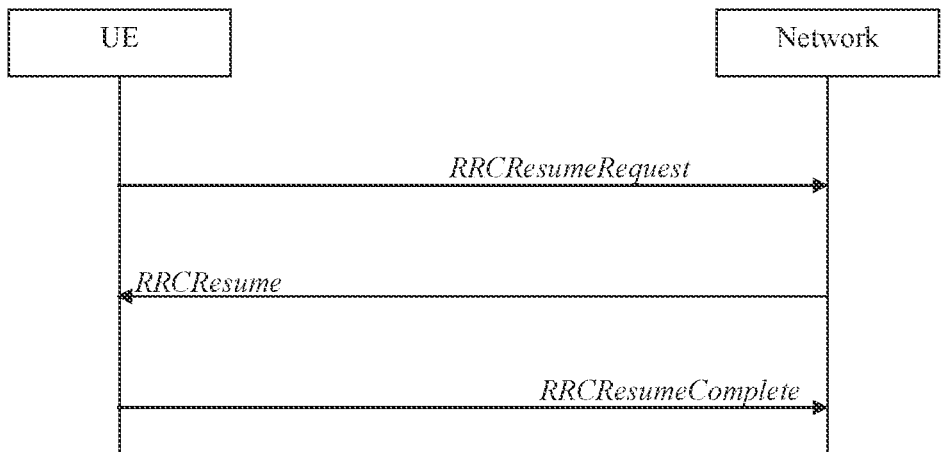
FIG. 6A *PRIOR ART*
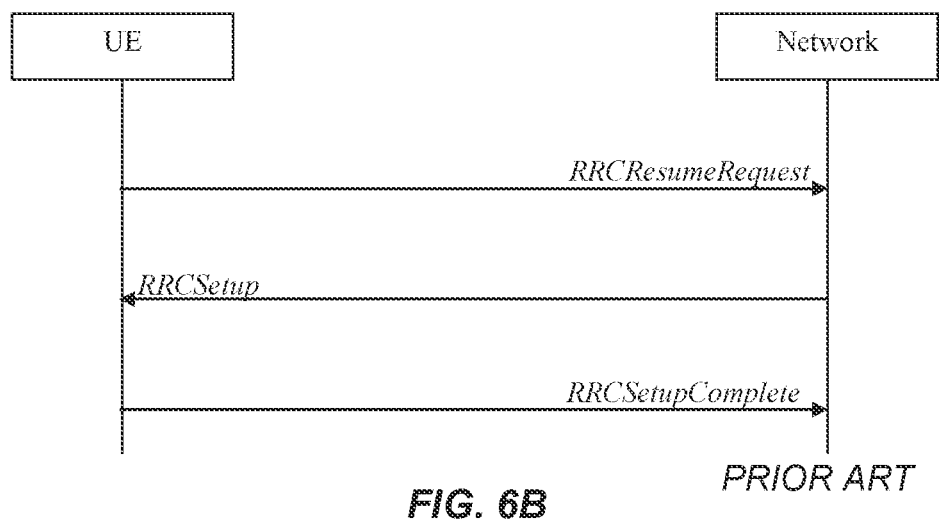
FIG. 6B *PRIOR ART*
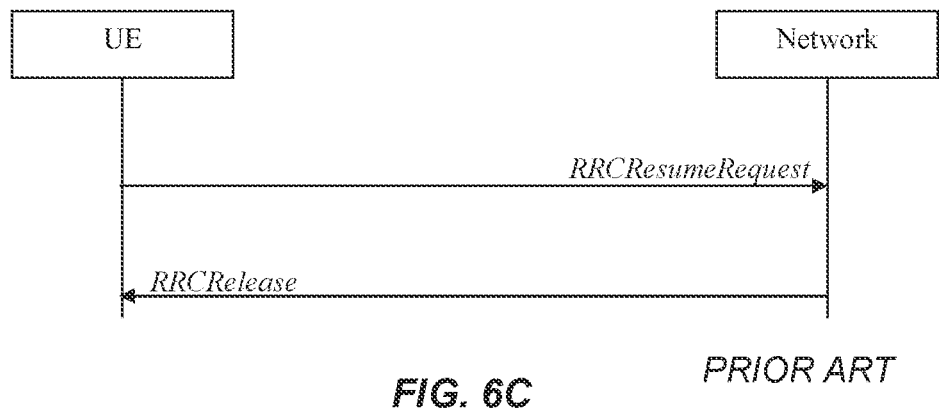
FIG. 6C *PRIOR ART*

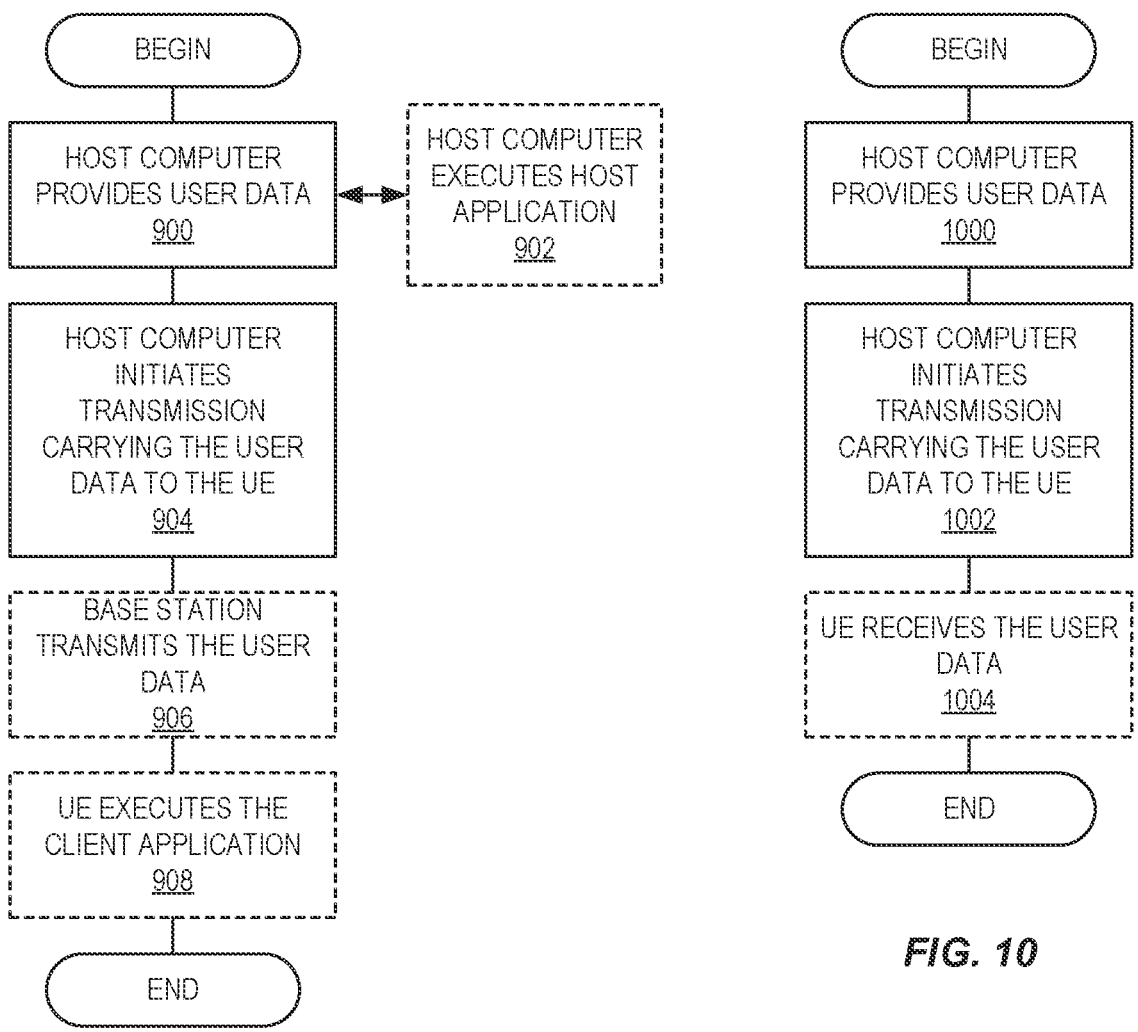

METHODS FOR HANDLING PERIODIC RADIO ACCESS NETWORK NOTIFICATION AREA (RNA) UPDATE CONFIGURATION UPON REJECT

TECHNICAL FIELD

The present disclosure generally relates to the field of wireless network communications, and more particularly, to network management of a UE operating in a suspended state in a RAN.

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Rel-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 Interface, as shown in FIG. 1. The eNBs are also responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Protocol (IP) data packets between the UE and the EPC, and serves as the local mobility anchor for the data bearers when the UE moves between eNBs, such as eNBs 105, 110, and 115.

FIG. 2A shows a high-level block diagram of an exemplary LTE architecture in terms of its constituent entities—UE, E-UTRAN, and EPC—and high-level functional division into the Access Stratum (AS) and the NAS. FIG. 1 also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, reassembly and reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane, such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink.

To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where a subframe consists of slots #0 and #1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular symbol in a particular subcarrier is known as a resource element (RE). Each RE is used to transmit a particular number of bits, depending on the type of modulation and/or bit-mapping constellation used for that RE. For example, some REs may carry two bits using Quadrature Phase shift Keying (QPSK) modulation, while other REs may carry four or six bits using 16- or 64-Quadrature Amplitude Modulation (QAM), respectively. The radio resources of the LTE PHY are also defined in terms of physical resource blocks (PRBs). A PRB spans $NRB_{sc}$ sub-carriers over the duration of a slot (i.e., $N^{DL}_{symb}$ symbols), where $NRB_{sc}$ is typically either 12 (with a 15-kHz sub-carrier bandwidth) or 24 (7.5-kHz bandwidth). A PRB spanning the same $NRB_{sc}$ subcarriers during an entire subframe (i.e., 2NDLsymb symbols) is known as a PRB pair. Accordingly, the resources available in a subframe of the LTE PHY DL comprise NDLRB PRB pairs, each of which comprises 2NDLsymb•$NRB_{sc}$ REs. For a normal CP and 15-KHz sub-carrier bandwidth, a PRB pair comprises 168 REs.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{DL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as 10-5 or lower and 1 ms end-to-end latency or lower. For eMBB, the requirements on latency and error probability can be less stringent whereas the required supported peak rate and/or spectral efficiency can be higher.

FIG. 4 illustrates a high-level view of the 5G network architecture, including a Next Generation RAN (NG-RAN) and a 5G Core (5GC). The NG-RAN can include a set of gNodeBs (gNBs) connected to the 5GC via one or more NG interfaces, whereas the gNBs can be connected to each other via one or more Xn interfaces. Each of the gNBs can support FDD, TDD, or a combination thereof.

The NG RAN logical nodes shown in FIG. 4 (and described in 3GPP TR 38.801 v1.2.0) include a Central Unit (CU or gNB-CU) and one or more Distributed Units (DU or gNB-DU). CU is a logical node that is a centralized unit that hosts high layer protocols and includes a number of gNB functions, including controlling the operation of DUs. A DU is a decentralized logical node that hosts lower layer protocols and can include, depending on the functional split option, various subsets of the gNB functions. (As used herein, the terms "central unit" and "centralized unit" are used interchangeably, and the terms "distributed unit" and "decentralized unit" are used interchangeability.)

The NG, Xn-C and F1 items shown in FIG. 4 are logical interfaces. For NG-RAN, the NG and Xn-C interfaces for a split gNB (e.g., consisting of a gNB-CU and gNB-DUs) terminate in the gNB-CU. Likewise, for EN-DC, the S1-U and X2-C interfaces for a split gNB terminate in the gNB-CU. The gNB-CU connects to gNB-DUs over respective F1 logical interfaces. The gNB-CU and connected gNB-DUs are only visible to other gNBs and the 5GC as a gNB, e.g., the F1 interface is not visible beyond gNB-CU.

Furthermore, a CU can host protocols such as RRC and PDCP, while a DU can host protocols such as RLC, MAC and PHY. Other variants of protocol distributions between CU and DU exist, such as hosting the RRC, PDCP and part of the RLC protocol in CU (e.g., Automatic Retransmission Request (ARQ) function), while hosting the remaining parts of the RLC protocol in the DU, together with MAC and PHY. In some exemplary embodiments, CU is assumed to host RRC and PDCP, where PDCP is assumed to handle both UP traffic and CP traffic. Nevertheless, other exemplary embodiments may utilize other protocol splits that by hosting certain protocols in CU and certain others in the DU. Exemplary embodiments can also locate centralized control plane protocols (e.g., PDCP-C and RRC) in a different CU with respect to the centralized user plane protocols (e.g., PDCP-U).

In LTE Rel-13, a mechanism was introduced for the UE to be suspended by the network in a suspended state similar to RRC_IDLE but with the difference that the UE stores the AS context or RRC context. This makes it possible to reduce the signaling when the UE is becoming active again by resuming the RRC connection, instead of the prior approach of establishing the RRC connection from scratch. Reducing the signaling could have several benefits including reduced UE latency (e.g., for smart phones accessing Internet and reduced UE signaling), which further leads to reduced UE energy consumption, particularly for machine type communication (MTC) devices that send very little data (i.e., signaling being a primary consumer of energy).

The Rel-13 solution is based on the UE sending a RRC-ConnectionResumeRequest message to the network and in response, receiving an RRCConnectionResume message from the network. The RRCConnectionResume is not encrypted but is integrity protected.

As part of the 3GPP standardized work on 5G, it has been decided that NR should support an RRC_INACTIVE state with similar properties as the suspended state in LTE Rel-13. The RRC_INACTIVE state has slightly different properties in that it is a separate RRC state and not part of RRC_IDLE as in LTE. Additionally, the CN/RAN connection (NG or N2 interface) is kept alive during RRC_INACTIVE while it was suspended in LTE.

FIG. 5A is an exemplary state transition diagram showing possible transitions between RRC states in NR. The properties of the states shown in FIG. 5A are summarized as follows. At RRC_IDLE, a UE specific discontinuous reception (DRX) may be configured by upper layers, and a UE controlled mobility is based on a network configuration. The UE monitors a Paging channel for CN paging using 5G-S-TMSI, performs neighbor cell measurements and cell (re-) selection and acquires system information.

At RRC_INACTIVE, a UE specific DRX may be configured by upper layers or by the RRC layer, and UE controlled mobility is based on a network configuration. The UE: stores the AS context; monitors a Paging channel for CN paging using 5G-S-TMSI and RAN paging using I-RNTI, performs neighboring cell measurements and cell (re-)selection; performs RAN-based notification area updates periodically and when moving outside the RAN-based notification area; and acquires system information.

At RRC_CONNECTED, the UE stores the AS context, and there is a transfer of unicast data to/from the UE. At lower layers, the UE may be configured with a UE-specific DRX. For UEs supporting CA, use of one or more secondary cells (SCells), aggregated with the SpCell, for increased bandwidth. For UEs supporting DC, one secondary cell group (SCG) may be aggregated with the master cell group (MCG), for increased bandwidth. The RRC_CONNECTED state may include network controlled mobility, i.e., handover within NR and to/from E-UTRAN. The UE: monitors a Paging channel; monitors control channels associated with the shared data channel to determine if data is scheduled for it; provides channel quality and feedback information; performs neighboring cell measurements and measurement reporting; and acquires system information.

FIG. 5B shows an exemplary flow diagram, between a UE and an NR gNB, of various operations during a procedure for transition from RRC_CONNECTED to RRC_INACTIVE.

It has been agreed in 3GPP NR standardization that the transition from RRC_CONNECTED to RRC_INACTIVE is done in one step, and, may contain a timer for periodic RAN Notification Area (RNA) updates. It is assumed that the UE shall start the timer (called T380) upon receiving the RRCSuspend (or equivalent) message shown in FIG. 5B. Is also assumed that the UE shall trigger a periodic RNAU upon the expiry of T380. This is currently specified as follows in sections 5.3.14.3-4 of 3GPP TS 38.331:

5.3.14.3 Reception of the RRCSuspend by the UE

The UE shall:
1> delay the following actions defined in this sub-clause X ms from the moment the RRCSuspend message was received or optionally when lower layers indicate that the receipt of the RRCSuspend message has been successfully acknowledged, whichever is earlier;

Editor's Note: How to set the value of X (whether it is configurable, or fixed to 60 ms as in LTE, etc.).
1> if the RRCSuspend message includes the idleMode-MobilityControlInfo:
  2> store the cell reselection priority information provided by the idleModeMobilityControlInfo;
  2> if the t320 is included:
    3> start timer T320, with the timer value set according to the value of t320;
1> else:
  2> apply the cell reselection priority information broadcast in the system information;
1> store the following information provided by the network: resumeIdentity, nextHopChainingCount, ran-PagingCycle and ran-NotificationAreaInfo;
1> re-establish RLC entities for all SRBs and DRBs;
1> reset MAC;
1> except if the RRCSuspend message was received in response to an RRCResumeRequest:
  2> store the UE AS Context including the current RRC configuration, the current security context, the PDCP state including ROHC state, C-RNTI used in the source PCell, the cellIdentity and the physical cell identity of the source PCell;
1> suspend all SRB(s) and DRB(s), except SRB0;
1> start timer T380, with the timer value set to periodic-RNAU-timer;
1> indicate the suspension of the RRC connection to upper layers;
1> configure lower layers to suspend integrity protection and ciphering;
1> enter RRC_INACTIVE and perform procedures as specified in TS 38.304 [21]

5.3.14.4 T380 expiry or UE entering a cell not belonging to the RNA

The UE shall:
1> if T380 expires:
  2> initiate RRC connection resume procedure in 5.3.13 with cause value set to 'ffs';
1> If UE entering a cell not belonging to the RNA:
  2> initiate RRC connection resume procedure in 5.3.13 with cause value set to 'ffs';

Another action related to this timer T380 is the stop criteria. In the current CR on Connection Control, the UE stops timer T380 when it expires and initiates a Resume procedure by sending an RRCResumeRequest message with cause value related to RNA (e.g. 'rna-update' or 'periodic-ma-update'). In addition to that case, the specifications also describe that the UE stops the T380 timer upon sending an RRCResumeRequest. The purpose of this procedure is to resume an RRC connection including resuming signaling radio bearers (SRBs) and data radio bearers (DRB), or perform an RNA update.

FIGS. 6A-E show exemplary flow diagrams of RRC connection resume procedures involving the UE sending an RRCResumeRequest message to the network, with various network responses. FIG. 6A shows a successful RRC connection resume. FIG. 6B shows an RRCResumeRequest with fallback to RRC connection establishment, which is successful. FIG. 6C shows an RRCResumeRequest followed by network release, which is successful. FIG. 6D shows an RRCResumeRequest followed by network suspend, which is successful. FIG. 6E shows an RRCResumeRequest followed by network rejection. Each of the network responses shown in FIGS. 6B-E can be considered different ways of rejecting the RRCResumeRequest, using different messages.

The UE initiates the RRC connection resume procedure upon request of upper layers, when responding to NG-RAN paging, or upon triggering RNA updates while the UE is in RRC_INACTIVE state. This is currently specified in 3GPP TS 38.331 section 5.3.13.2, as follows:

Upon initiation of the procedure, the UE shall:
1> apply the default physical channel configuration as specified in 9.2.4;
1> apply the default semi-persistent scheduling configuration as specified in 9.2.3;
1> apply the default MAC main configuration as specified in 9.2.2;
1> apply the CCCH configuration as specified in 9.1.1.2;
1> start timer T300X;
1> stop timer T380;
1> initiate transmission of the RRCResumeRequest message in accordance with 5.3.13.2 . . .

For the scenario of RNA updates triggered with the UE is in RRC_INACTIVE state, the UE sends an RRCResumeRequest message with cause value 'ma-update' (or equivalent). In response, if the network is overloaded, it has been agreed that the network can send an RRCReject message containing a wait timer, which corresponds to the flow diagram shown in FIG. 6E. The UE's handing of the RRCReject message is currently specified as:

5.3.13.8 Reception of the RRCReject by the UE
The UE shall:
1> stop timer T314;
1> reset MAC and release the MAC configuration;
1> start timer T302, with the timer value set to the waitTime;
1> if RRCReject is sent in response to an RRCResumeResquest triggered by upper layers;
2> inform upper layers about the failure to resume the RRC connection and access control related information, upon which the procedure ends;

However, there is no specification of the actions to be taken by the UE upon receiving an RRCReject, as shown in FIG. 6E, in response to an RRCResumeRequest, triggered due to periodic RNA. For example, there is no specification of action associated with T380 timer and the RNA update functionality. In addition to that, while the specification requires the UE to "inform upper layers about the failure to resume the RRC connection and access control related information," in reality, an RNA update is handled by an RRC/AS layer rather than "upper layers."

Furthermore, since the network sends an RRCReject on signaling radio bearer zero (SRB0), the UE remains unaware of whether or not the network has updated the UE's current location based on the RNAU indicator. Hence, it is not obvious whether or not the UE should send another RNAU once the wait timer expires. Currently, the procedure for this scenario remains quite unclear. As such, there is the potential for different UE implementations producing anomalous behavior including, e.g., unnecessary signaling between the UE and network, leading to increased power consumption of the UE and network and the need to allocate scarce network resources to handle this additional signaling capacity.

SUMMARY

Exemplary embodiments disclosed herein address these problems, issues, and/or drawbacks of existing solutions by providing a flexible but efficient approach for operating a UE in a suspended state in a RAN. These exemplary embodiments manage multiple UE resources, including a plurality of timers associated with the RRC protocol, in an efficient and clearly-defined manner, thereby avoiding anomalous UE and network behavior. These exemplary embodiments provide improvements to the operation of UEs in a cellular network including, but not limited to, reducing unnecessary signaling between the UE and network; reducing power consumption of the UE and network, particularly for low-power machine-time UEs; and freeing up scarce UE and network resources to handle other important tasks, such as transmission/reception of user data.

Embodiments of the present disclosure include methods and/or procedures for operating a UE in a suspended state in a RAN. In some embodiments, a method may include transmitting an RRCResumeRequest message in response to expiration of a first timer. In some embodiments, the first timer is associated with a periodic RNAU, e.g., timer T380 as defined in 3GPP specifications.

The method may include receiving, in response to the RRCResumeRequest message, a reject message. In some embodiments, the reject message is one of: an RRCSetup message, an RRCRelease message, an RRCSuspend message, and an RRCReject message. The RRCResumeRequest message may include a cause value indicating a cause of an RNAU. In some embodiments, the second timer is a wait timer usable by the UE, e.g., timer T302 as defined in 3GPP specifications.

The method includes, in response to the reject message, starting a second timer. Some embodiments include restarting the first timer. In such embodiments, the first timer may be restarted using a first stored value and the second timer may be started using a second stored value. The first stored value may be less than, equal to, or greater than the second stored value. In some embodiments, the first timer is restarted if the reject message comprises an indication that the UE's context is stored by the network. Other embodiments can include stopping the first timer and setting the periodic RNAU as a pending notification.

In some embodiments, the method also includes incrementing a counter associated with the reject message. In some embodiments, the reject message includes a particular cause value of a plurality of cause values, and incrementing a counter includes incrementing a particular counter associated with the particular cause value. The particular cause value may be associated with the RRCResumeRequest message.

In some embodiments, the method includes subsequently transmitting a further RRCResumeRequest message. In some embodiments, when the first stored value (e.g., used to restart the first timer) is less than the second stored value (e.g., used to start the second timer), the further RRCResumeRequest message is transmitted in response to the expiration of the restarted first timer. In some embodiments, when the first stored value is less than the second stored value, the further RRCResumeRequest message is transmitted in response to the expiration of the restarted first timer. In other embodiments, when the first stored value is greater than the second stored value, the further RRCResumeRequest message is transmitted in response to one of: expiration of the second timer and the restarted first timer; and expiration of the second timer and another event prior to expiration of the restarted first timer. The other event may include cell reselection or availability of data for transmission.

In other embodiments, when the first stored value is less than the second stored value, the further RRCResumeRequest message is transmitted in response to expiration of the second timer. In other embodiments, when the first stored value is less than the second stored value, the further RRCResumeRequest message is transmitted in response to expiration of the first timer and an access-control configuration that enables the UE to transmit the further RRCResumeRequest prior to expiration of the second timer.

In embodiments that include the operation of incrementing the counter, the method includes comparing the value of the incremented counter to a predetermined threshold. In some embodiments, if the value of the incremented counter is greater than or equal to the predetermined threshold, the further RRCResumeRequest message is transmitted prior to expiration of the second timer. In some embodiments, if the value of the incremented counter is greater than or equal to the predetermined threshold, the operations include discarding a context associated with the UE and transmitting the further RRCResumeRequest message upon expiration of the second timer or cell reselection. The method may include setting a value of a periodic RNAU pending register to "true" in response to receiving the reject message.

Other embodiments include wireless devices and/or UE configurable to perform operations corresponding to the exemplary methods and/or procedures described above. Other embodiments include non-transitory, computer-readable media storing program instructions that, when executed by at least one processor, configure such wireless devices and/or UEs to perform operations corresponding to the exemplary methods and/or procedures described above.

Embodiments of the present disclosure include methods and/or procedures for network management of a UE operating in a suspended state in a RAN. A method may include receiving an RRCResumeRequest message from the UE, wherein the RRCResumeRequest message is associated with a periodic UE event. The periodic UE event may be a periodic RNAU. The method includes transmitting, to the UE in response to the RRCResumeRequest message, a reject message associated with a second timer. In some embodiments, the reject message is one of: an RRCSetup message, an RRCRelease message, an RRCSuspend message, and an RRCReject message. In some embodiments, the second timer can be a wait timer usable by the UE, e.g., timer T302 as defined in 3GPP specifications. In some embodiments, the reject message can also include a particular cause value of a plurality of available cause values. In some embodiments, the reject message includes an indication that a context associated with the UE is being stored by the network. The method also includes receiving a further RRCResumeRequest message from the UE, where the further RRCResumeRequest message is received during a period bounded approximately by the lesser of a duration of the second timer and a period of the periodic UE event, and the greater of the duration of the second timer and the period of the periodic UE event. In some embodiments, the method includes transmitting, to the UE in response to the further RRCResumeRequest message, a further reject message, and discarding a context associated with the UE.

Other embodiments include network devices (e.g., base stations, eNBs, gNBs, etc.) configurable to perform operations corresponding to the exemplary methods and/or procedures described above. Other embodiments include non-transitory, computer-readable media storing program instructions that, when executed by at least one processor, configure such network devices to perform operations corresponding to the exemplary methods and/or procedures described above.

These and other objects, features and advantages of the exemplary embodiments of the present disclosure will become apparent upon reading the following detailed description of the exemplary embodiments of the present disclosure.

Further aspects of the present invention are directed to an apparatus, network node, base station, wireless device, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIGS. 6A-E show exemplary flow diagrams of RRC connection resume procedures involving the UE sending an RRCResumeRequest message to the network, with various network responses, according to various embodiments of the present disclosure.

FIGS. 9-12 are flow diagrams illustrating various exemplary methods and/or procedures implemented in a communication system, according to various embodiments of the present disclosure.

DETAILED DESCRIPTION

Figure 1:
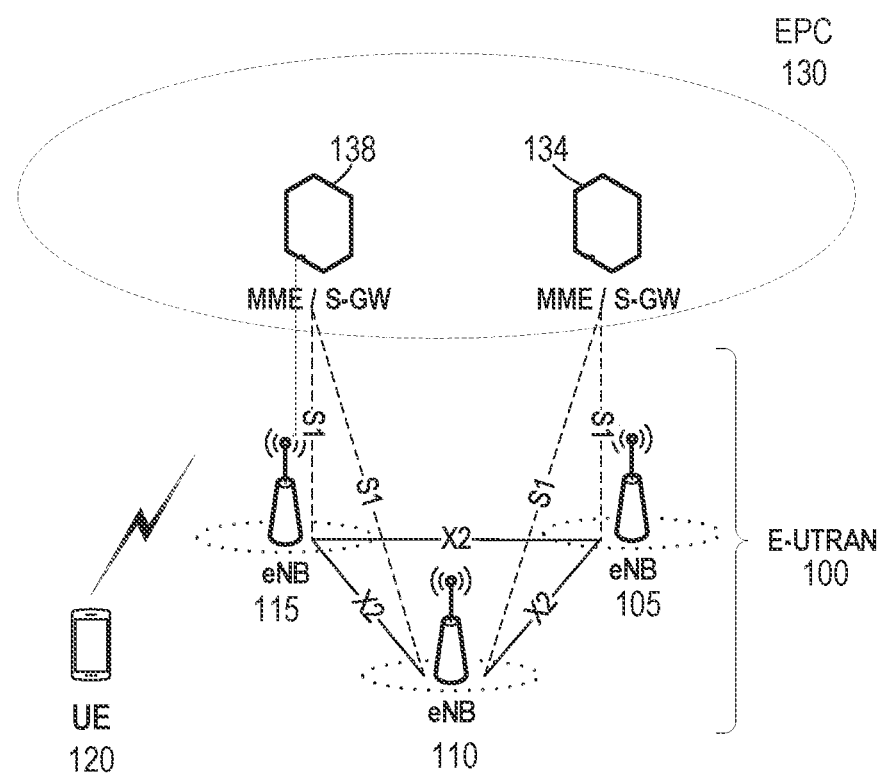
FIG. 1 is a high-level block diagram of an exemplary architecture of LTE E-UTRAN and EPC network, as standardized by 3GPP.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a RAN of a cellular communications network that operates to wirelessly transmit and/or receive signals. Some examples of a radio access node include, but are not limited to, a base station (e.g., an NR base station (gNB) in a 3GPP 5G NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a MME, a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR concepts) beams may be used instead of cells and, as such, concepts described herein apply equally to both cells and beams.

Various exemplary embodiments are described herein as methods, procedures, and/or operations performed by a UE in RRC_INACTIVE state in an NR network. These embodiments are used for the purpose of illustration only, without limitation. For example, principles of these embodiments are equally applicable to other configurations, scenarios, and/or network types included, but not limited to: UEs in RRC_INACTIVE state in LTE networks; and UE inter-RAT procedures in RRC_INACTIVE, mainly between LTE and NR RANs connected to the same CN (5G Core Network). In these scenarios, the periodic RNA update timer, T380, is defined as an inter-RAT timer (i.e., it keeps running even when UE is changing RAT). If T380 expires when the UE is in the other RAT, the UE will perform periodic RNA update in that RAT.

One inter-RAT scenario includes a UE in LTE RRC_CONNECTED that is suspended to LTE RRC_INACTIVE, starts T380, performs mobility management and camps on an NR cell (i.e., becomes RRC_INACTIVE in NR). While in NR, T380 expires and the UE tries to perform an RNA update (with a resume request) in NR. The network can respond with an RRCReject.

In another scenario, a UE in NR RRC_CONNECTED is suspended to NR RRC_INACTIVE, starts T380, performs mobility management, and camps on an LTE cell (i.e., becomes RRC_INACTIVE in LTE). While in LTE, T380 expires and the UE tries to perform an RNA update (with a resume request) in NR. The network can respond with an RRCReject. Various exemplary embodiments are described herein as methods, procedures, and/or operations performed by a UE upon receiving a reject message associated with a wait timer. These embodiments are used for the purpose of illustration only, without limitation. For example, principles of these embodiments are equally applicable to other configurations, scenarios, and/or network types involving a "reject functionality" by the network but without using this exact message. For example, an RRCRelease or RRCRelease with suspend configuration may also include a wait timer so that UE shall not access the system until that timer expires (or the UE performs cell reselection). In the case where the system supports the "reject functionality" via RRCReject or RRCRelease, there may also be differences in UE behavior depending on which message the network uses to respond to the UE. For example, the RRCReject is typically sent using SRB0, which is unprotected, while RRCRelease with suspend indication (or equivalent message) moving UEs to RRC_INACTIVE state uses SRB1, which is protected and secure. These aspects are discussed later with respect to various embodiments.

In a first group of embodiments, the UE receives a reject message with an associated wait time (e.g., RRCReject or RRCRelease with a wait timer) in response to a periodic RNA update (e.g., triggered by the expiry of T380). Upon receipt of the message, the UE starts a reject wait timer (e.g., T302 in NR draft specifications), and restarts the periodic RNAU timer T380 with its currently stored value. This stored value can be, for example, the value received in a previous RRC message when UE was moved to RRC_I-

NACTIVE state, such as an RRCRelease with suspend configuration. By restarting the T380 timer, the UE performs a periodic RNAU attempt only upon when the timer expires again. This can provide, for example, a load protection mechanism from the network. For the exemplary case of the rejection being an RRCReject message, the UE's handing of the message can be specified, for example, as:

5.3.13.8 Reception of the RRCReject by the UE
The UE shall:
1> stop timer T314;
1> reset MAC and release the MAC configuration;
1> start timer T302, with the timer value set to the waitTime;
1> restart timer T380, with the value set to the stored value periodic-RNAU-timer;
1> if RRCReject is sent in response to an RRCResumeRequest triggered by upper layers;
  2> inform upper layers about the failure to resume the RRC connection and access control related information, upon which the procedure ends; . . . .

This first group of embodiments can be especially advantageous in cases where the message is sent on unsecure SRB0, over which a context cannot be sent. In contrast, if sent over SRB1, the network would be able to update the context and explicitly provide a periodic RNAU timer. One advantage of restarting the T380 timer based on its stored value is that the UE behaves according to the defined periodic RNAU timer, without the need to specify exceptional actions.

Figure 18A:
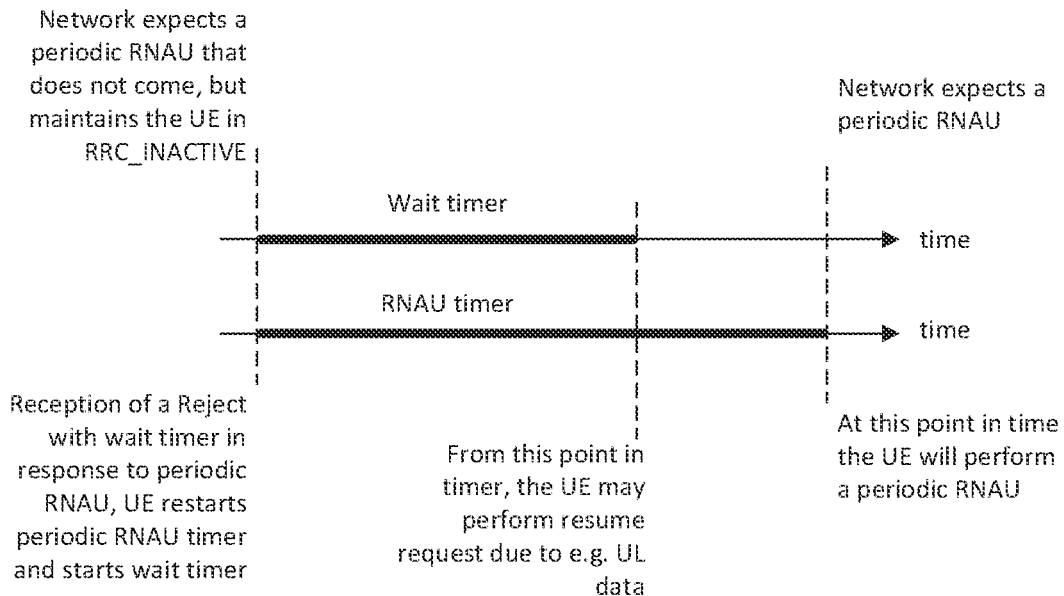
FIGS. 18A-B are exemplary timing diagrams illustrating operations according to various embodiments of the present disclosure.

Various embodiments of the first group include different operations that depend, for example, on the relation between the stored values of timers T380 and T302. In some embodiments, if the previously stored value for periodic RNAU timer is greater than the stored value for the wait timer (i.e., T380>T302), the UE can send another RRCResumeRequest in that cell for other reasons (e.g., due to UL data in buffer) when T302 expires (or in another cell, in case UE performs cell reselection). However, the UE will not attempt to perform a periodic RNAU when T302 expires. Moreover, when the UE performs cell reselection, T302 is stopped and the UE performs periodic RNAU when T380 expires without regard to T302. An exemplary timing diagram corresponding to this embodiment (i.e., T380>T302) is shown in FIG. 18A.

From the network's perspective, the above-described UE behavior can result in the network not receiving a first periodic RNAU when expected. However, the network can be aware that a rejection with restart of T380 can occur due to rejection in a specific cell, without necessarily updating the UE context about that reject occurrence. In such a case, the network may assume that the UE is still in coverage within the RNA and thus reachable in RRC_INACTIVE state. As such, in various embodiments, the network can wait a further number of RNAU periods before releasing the UE context, assuming the UE may have been rejected a further number of times. In such a case, the network can attempt to page the UE via the RAN even if it did not receive a first periodic RNAU when T380 initially expired. If the network does not receive an RNAU after this further number of periods, the network can then discard the UE context and attempt to page the UE via the CN.

In other embodiments of the first group, if the previously stored value for periodic RNAU timer is less than the stored value for the wait timer (i.e., T380<T302), T380 can expire while T302 is still running. In some of these embodiments, the UE does not send a periodic RNAU after T380 expiry while T302 is running Although the network knows the UE context, the network may not know that UE was rejected in a specific cell with a longer wait timer than T380. Consequently, the network expects to receive the periodic RNAU that does not come due to the longer wait timer protection. In such a case, the network can discard the UE context after some further number of RNAU periods if a periodic RNAU has not been received.

Figure 18B:
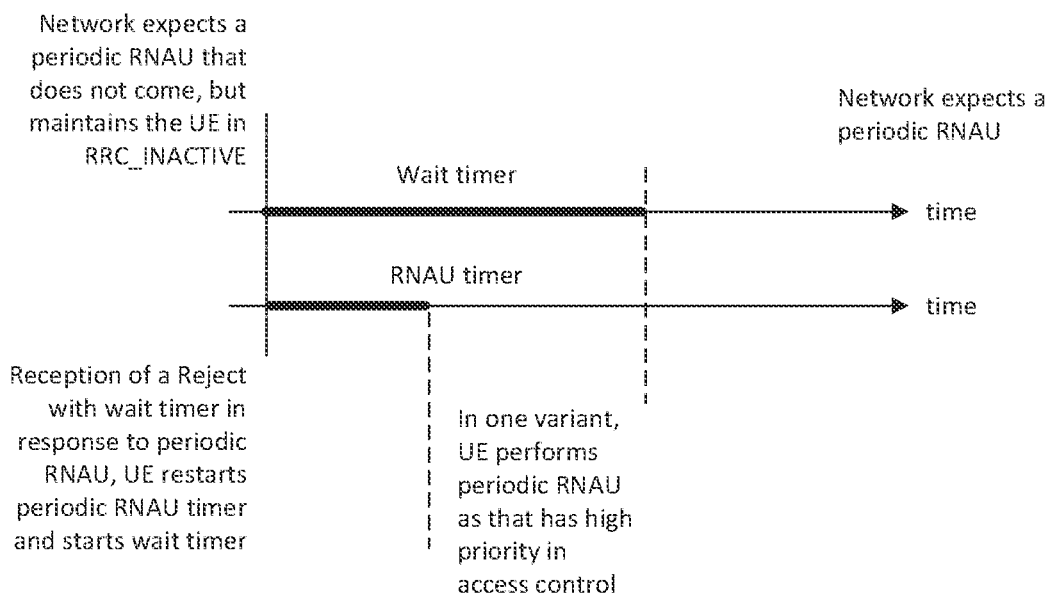

In other embodiments of the first group, the UE does send a periodic RNAU after T380 expiry while T302 is running. For example, the periodic RNAU can be treated as an exception and handled under the UE's access control policies such that it has high priority and can be sent even while timer T302 is running. This approach can simplify network implementation because the network knows that periodic RNAUs have higher priority and can be sent even though UE has been rejected. An exemplary timing diagram corresponding to this embodiment (i.e., T380<T302 with high-priority RNAU handling) is shown in FIG. 18B.

In other embodiments of the first group, the UE may restart the timer T380 upon the reception of reject message from the network if the RRCResumeRequest is associated to any other cause value than only periodic RNAUs. In other embodiments of the first group, the UE may restart the timer T380 only if it receives an indication in the reject message from the network. The network can provide such an indication if it has the UE context available but still prefers to reject the UE. For example, an overloaded gNB that rejected the UE can still have the capability to send a message to another gNB that stored the UE context (e.g., over X2 or Xn, or via the CN), indicating that the UE attempted to perform a periodic RNAU, i.e., that the UE is still "alive".

In some embodiments, the message may include a UE identifier (e.g., I-RNTI), a security checksum (for verification of the UE), a cause value (e.g., periodic RNA update), etc. If the gNB that rejected the UE also stores the UE context, this update/indication can be handled locally (e.g., via an intra-gNB interface). In other embodiments of the first group, upon receiving the reject message in response to a periodic RNA update, the UE can start the reject wait timer (e.g., T302), restart the periodic RNAU timer to a default value, and notify the RRC layer.

In a second group of embodiments, upon receiving the reject message (e.g., RRCReject) in response to a periodic RNA update, the UE may start the reject wait timer (e.g., T302), stop the periodic RNAU timer T380, and notify its RRC layer, which makes that periodic RNA update a pending notification. Consequently, the UE may attempt to send that periodic RNAU as soon as it is able to perform another resume attempt including, e.g., upon cell reselection and/or upon the expiry of T302. For the case of the rejection being an RRCReject message, the UE's handing of the message can be specified, for example, as:

5.3.13.8 Reception of the RRCReject by the UE
The UE shall:
1> stop timer T314;
1> reset MAC and release the MAC configuration;
1> start timer T302, with the timer value set to the waitTime;
1> stop T380, if running;
1> if RRCReject is sent in response to an RRCResumeResquest triggered by upper layers;
  2> inform upper layers about the failure to resume the RRC connection and access control related information, upon which the procedure ends;
1> if RRCReject is sent in response to an RRCResumeRequest due to a periodic RAN update (i.e. upon the expiry of T380 timer);

2> inform RRC layer (or AS layer) about the failure to resume the RRC connection and access control related information (i.e. due to reject with wait timer), upon which the procedure ends;

2> upon the expiry of T302, the UE shall perform the periodic RNAU that is pending;

In some embodiments of the second group, the UE only sets the periodic RNAU as pending if it receives an indication in the reject message. For example, the network may send such an indication if it has the UE context available but still prefers to reject the UE. If the UE's access control policies allow it to perform a resume request attempt, and that attempt is successful, then the pending RNAU becomes obsolete. In some embodiments, the UE may set the value of a "periodic RNAU pending" register to true, e.g., when initiating the periodic RNAU, when receiving the reject message, or when performing cell re-selection. The UE can then set the value of this register to "false" when the UE receives a Release with suspend message, or a reject message with indication that periodic RNAU has been completed. While the register is set to "true," the UE will attempt to perform a periodic RNAU when feasible.

In a third group of embodiments, upon being rejected in response to a periodic RNA update, the UE may start the reject wait timer (e.g., T302), stop the periodic RNAU timer T380, and notify its RRC layer about the reject message. Instead of attempting to send the periodic RNAU upon performing another resume attempt, however, the UE simply stops the periodic RNAU timer and notifies the RRC layer about the reject message and that a periodic RNAU does not need to be triggered upon expiry of wait timer T302. In such a case, the network can be configured, in a complementary manner, to be aware that the UE will not attempt a periodic RNAU and to retain the UE's context for some predetermined duration before discarding it.

This third group of embodiments can be especially advantageous in cases where reject message is sent on secure SRB1, e.g., as an RRCRelease message that includes a wait timer. In such case, UE knows that the network updated the context even though it rejected the periodic RNAU.

All three groups of embodiments were described above in terms of the reject message being in response to an RRCResumeRequest triggered by a periodic RNA update. This is merely exemplary for purpose of illustration, and the methods, procedures, and/or operations described above for handling of periodic RNAU timer can be applied to an RRCResumeRequest triggered in any manner.

In relation to (or in combination with) any of the exemplary embodiments described above, the UE can store information about the reception of reject messages from the network. In some embodiments, this information can include one or more counters that the UE increments at each rejected attempt. Each of the one or more counters can be specific per cause value, e.g., a counter for periodic RNAUs. In some embodiments, this information can include a location where the UE was rejected, such as any type of cell identifier (e.g., PCI) and/or network identifier (e.g., PLMN) pertaining to a rejected attempt.

The UE can use the stored information in different ways. In some embodiments, the UE can generate a report from that stored information and send it to the network when the UE enters RRC_CONNECTED state. In some embodiments, the UE uses the information as input to an access control function (ACF) that can grant the UE certain privileges in response. For example, if a periodic RANU is triggered while T302 is running, the ACF can authorize the UE to send a resume request with periodic RNAU depending on the number of unsuccessful periodic RNAU attempts.

Various other techniques can be used in relation to, or in combination with, any of the exemplary embodiments described above. For example, a protection mechanism can be employed such that after some predetermined number of rejected periodic RNAU attempts, the UE can perform various actions. The predetermined number can either be fixed by the 3GPP RRC standard or be configurable by a different RRC message from the network. In some embodiments, upon reaching the predetermined number, the UE can discard its context and notify the RRC layer and/or higher layers. Once the UE is permitted to access the network again (e.g., upon the expiry of T302 or upon cell reselection), it can perform a NAS recovery. In other embodiments, upon reaching the predetermined number, the UE can perform inter-frequency cell reselection or inter-RAT cell reselection and tries to perform a periodic RNAU.

Figure 19:
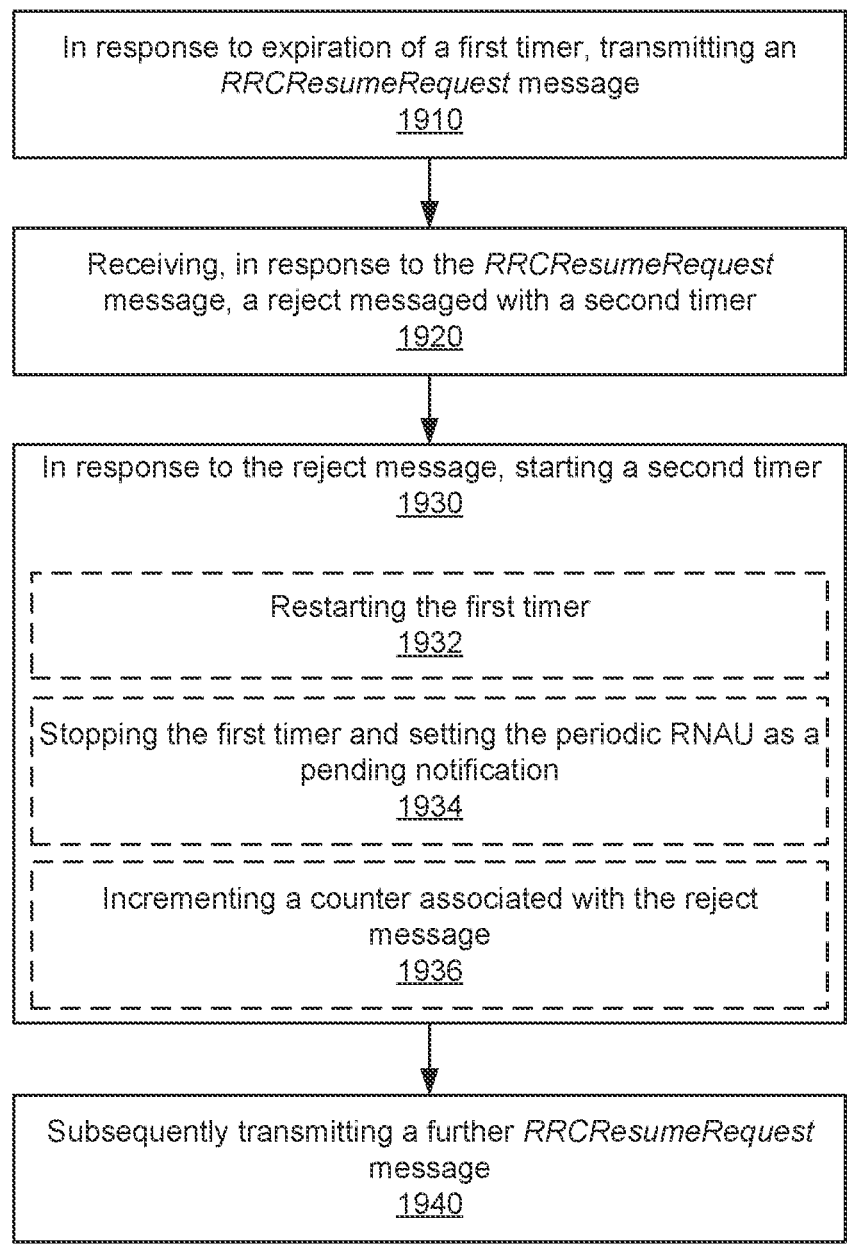
FIG. 19 is a flow diagram illustrating exemplary methods and/or procedures performed by a wireless device and/or UE according to various embodiments of the present disclosure.

FIG. 19 is a flow diagram illustrating an exemplary method and/or procedure for operating a UE in a suspended state in a RAN, according to various embodiments. The method shown in FIG. 19 can be implemented, for example, in a wireless device and/or UE shown in, or described in relation to, other figures herein. Furthermore, as explained below, the method may be utilized cooperatively with the method shown in FIG. 20 (described below), to provide various exemplary benefits described herein. In addition, although FIG. 19 shows blocks in a particular order, this order is merely exemplary, and the operations of the exemplary method and/or procedure can be performed in a different order than shown in FIG. 19 and can be combined and/or divided into blocks having different functionality. Optional operations are represented in FIG. 19 by dashed lines.

The method illustrated in FIG. 19 includes the operations of block 1910, in which the UE can transmit an RRCResumeRequest message in response to expiration of a first timer. In some embodiments, the first timer can be associated with a periodic RNAU, such as timer T380 as defined in 3GPP specifications.

The method illustrated in FIG. 19 also includes the operations of block 1920, in which the UE receives, in response to the RRCResumeRequest message, a reject message associated with a second timer. In some embodiments, the reject message is one of: an RRCSetup message, an RRCRelease message, an RRCSuspend message, and an RRCReject message. In some embodiments, the second timer can be a wait timer usable by the UE, e.g., timer T302 as defined in 3GPP specifications.

The method illustrated in FIG. 19 also includes the operations of block 1930, in which the radio node may, in response to the reject message, start a second timer. In some embodiments, the operations of block 1930 include the operations of sub-block 1932, in which the UE can also restart the first timer. In such embodiments, the first timer may be restarted using a first stored value and the second timer may be started using a second stored value. The first stored value may be less than, equal to, or greater than the second stored value. In some embodiments, the operations of sub-block 1932 involve restarting the first timer if the reject message comprises an indication that the UE's context is stored by the network.

In other embodiments, the operations of block 1930 include the operations of sub-block 1934, in which the UE may also stop the first timer and set the periodic RNAU as a pending notification. In some embodiments, the operations of block 1930 include the operations of sub-block 1936, in which the UE can also increment a counter associated with the reject message. For example, the operations of sub-block 1936 may be used in addition, or in the alternative, to the operations of sub-blocks 1932 and 1934. In some embodiments, the reject message includes a particular cause value of a plurality of cause values, and incrementing a counter includes incrementing a particular counter associated with the particular cause value. The particular cause value may be associated with the RRCResumeRequest message. The RRCResumeRequest message may include a particular cause value (e.g., RNAU) and the rejections that are associated with RRCResumeRequests with that particular cause value may be counted.

The method illustrated in FIG. 19 includes the operations of block 1940, in which the UE can subsequently transmit a further RRCResumeRequest message. Several variations of this operation are possible, particularly when used in conjunction with optional sub-block 1932 described above. In some embodiments, when the first stored value is less than the second stored value, the further RRCResumeRequest message is transmitted in response to the expiration of the restarted first timer. In some embodiments, when the first stored value is less than the second stored value, the further RRCResumeRequest message is transmitted in response to the expiration of the restarted first timer. In other embodiments, when the first stored value is greater than the second stored value, the further RRCResumeRequest message is transmitted in response to one of: expiration of the second timer and the restarted first timer; and expiration of the second timer and another event prior to expiration of the restarted first timer. In some embodiments, the other event comprises one of cell reselection and availability of data for transmission.

In other embodiments, when the first stored value is less than the second stored value, the further RRCResumeRequest message is transmitted in response to expiration of the second timer. In other embodiments, when the first stored value is less than the second stored value, the further RRCResumeRequest message is transmitted in response to expiration of the first timer and an access-control configuration that enables the UE to transmit the further RRCResumeRequest prior to expiration of the second timer.

In embodiments in which the operations of block 1930 include the operations of sub-block 1936, the operations of block 1940 can also include the operations of sub-block 1942, in which the UE can also compare the value of the incremented counter to a predetermined threshold. In some embodiments, if the value of the incremented counter is greater than or equal to the predetermined threshold, the UE transmits the further RRCResumeRequest message prior to expiration of the second timer. In some embodiments, if the value of the incremented counter is greater than or equal to the predetermined threshold, the UE discards a context associated with the UE and transmits the further RRCResumeRequest message upon expiration of the second timer or cell reselection. The method may include setting a value of a periodic RNAU pending register to "true" in response to receiving the reject message.

Figure 20:
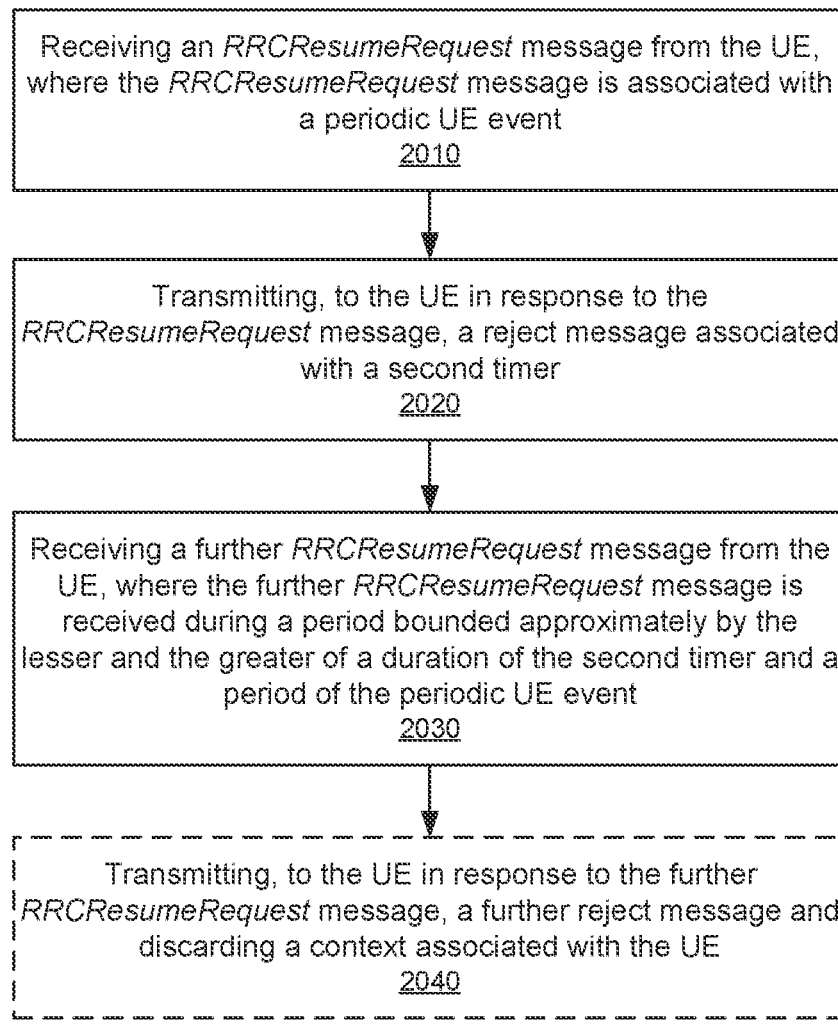
FIG. 20 is a flow diagram illustrating exemplary methods and/or procedures performed by a base station, eNB, or gNB, according to various embodiments of the present disclosure.

FIG. 20 is a flow diagram illustrating an exemplary method and/or procedure for network management of a UE operating in a suspended state in a RAN, according to various embodiments of the present disclosure. The method shown in FIG. 20 can be implemented, for example, in one or more of the radio nodes (e.g., base station, eNB, gNB, etc.) shown in, or described in relation to, other figures herein. Furthermore, as explained below, the exemplary method and/or procedure shown in FIG. 20 may be utilized cooperatively with the exemplary method and/or procedures shown in FIG. 19 (described above), to provide various exemplary benefits described herein. In addition, although FIG. 20 shows blocks in a particular order, this order is merely exemplary, and the operations of the exemplary method and/or procedure can be performed in a different order than shown in FIG. 20 and can be combined and/or divided into blocks having different functionality. Optional operations are represented in FIG. 20 by dashed lines.

In some embodiments, the method illustrated in FIG. 20 includes receiving an RRCResumeRequest message from the UE, where the RRCResumeRequest message is associated with a periodic UE event (block 2010). In some embodiments, the periodic UE event is a periodic RNAU. The method includes transmitting, to the UE in response to the RRCResumeRequest message, a reject message associated with a second timer. In some embodiments, the reject message is one of: an RRCSetup message, an RRCRelease message, an RRCSuspend message, and an RRCReject message. In some embodiments, the second timer is a wait timer usable by the UE, e.g., timer T302 as defined in 3GPP specifications. In some embodiments, the reject message includes a cause value of a plurality of available cause values. The RRCResumeRequest message may include a cause value indicating a cause of an RNAU. In some exemplary embodiments, the reject message can also include an indication that a context associated with the UE is being stored by the network.

The method includes the operations of block 2030, in which the radio node receives a further RRCResumeRequest message from the UE, where the further RRCResumeRequest message is received during a period bounded approximately by the lesser of a duration of the second timer and a period of the periodic UE event, and the greater of the duration of second timer and the period of the periodic UE event. In some embodiments, the method includes the operations of block 2040, in which the radio node can transmit, to the UE in response to the further RRCResumeRequest message, a further reject message, and discard a context associated with the UE.

Figure 7A:
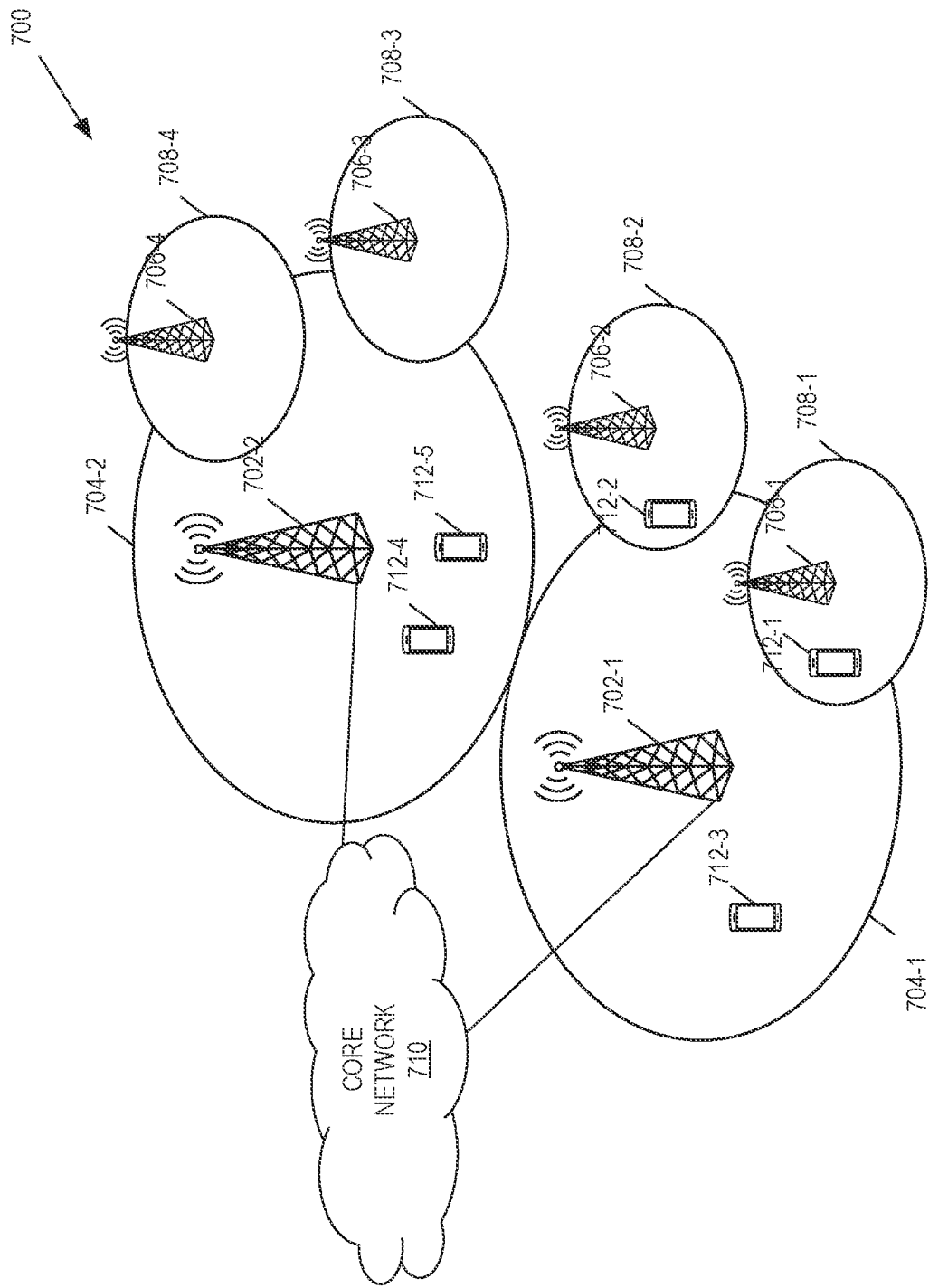
FIG. 7A is a block diagram of an exemplary cellular communications network according to some embodiments of the present disclosure.

FIG. 7A illustrates one example of a cellular communications network 700, comprising various devices and/or systems usable to implement any of the exemplary methods described above. In the embodiments described herein, the cellular communications network 700 is a 5G NR network. In this example, the cellular communications network 700 includes base stations 702-1 and 702-2, which in LTE are referred to as eNBs and in 5G NR are referred to as gNBs, controlling corresponding macro cells 704-1 and 704-2. The base stations 702-1 and 702-2 are generally referred to herein collectively as base stations 702 and individually as base station 702. Likewise, the macro cells 704-1 and 704-2 are generally referred to herein collectively as macro cells 704 and individually as macro cell 704. The cellular communications network 700 also includes a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The base stations 702 (and optionally the low power nodes 706) are connected to a core network 770.

The base stations 702 and the low power nodes 706 provide service to wireless devices 712-1 through 712-5 in the corresponding cells 704 and 708. The wireless devices 712-1 through 712-5 are generally referred to herein collectively as wireless devices 712 and individually as wireless device 712. The wireless devices 712 are also sometimes referred to herein as UEs. Wireless devices 712 can take on various forms, including those compatible with MTC and/or NB-IoT.

Figure 7B:
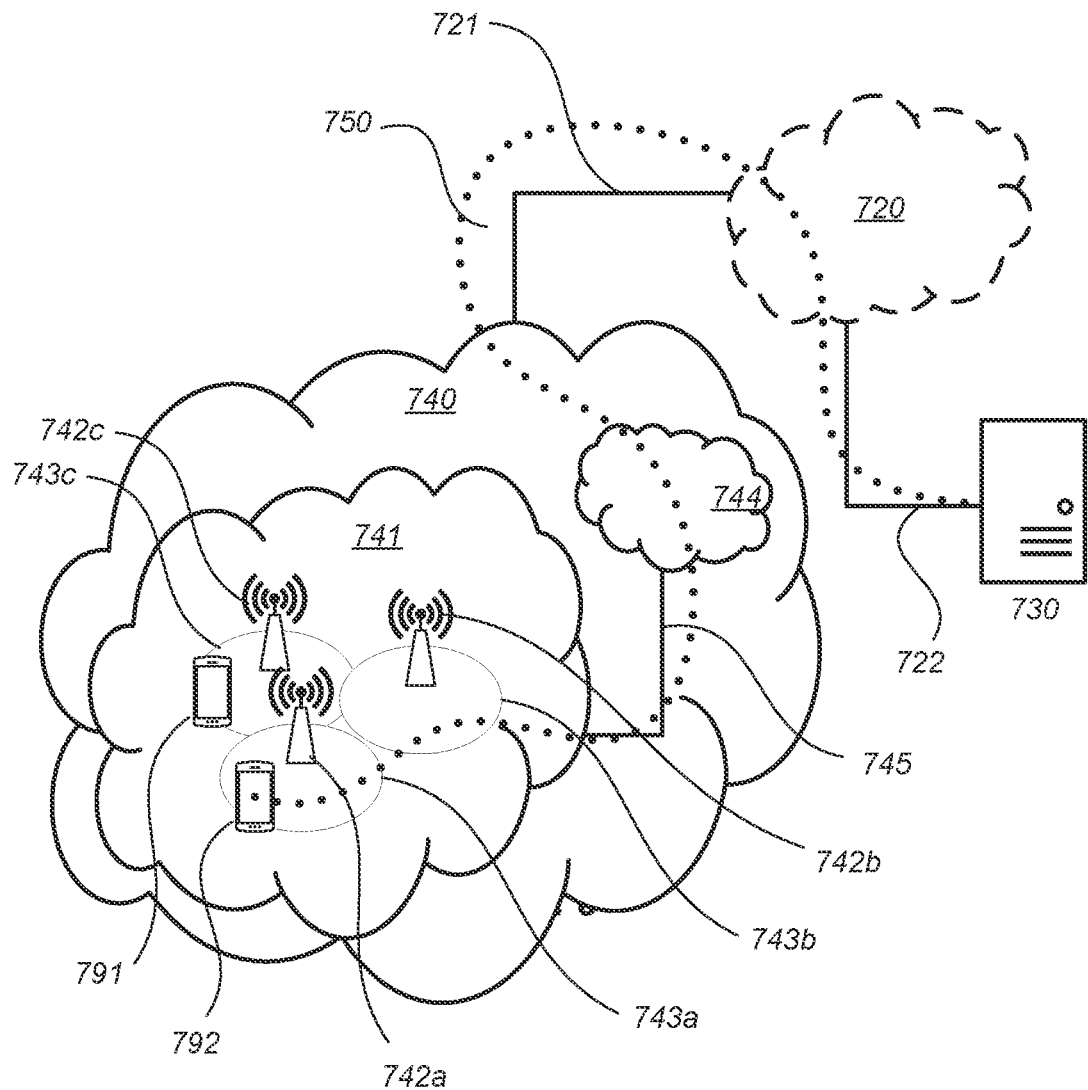
FIG. 7B is a block diagram of an exemplary communication system configurable according to various embodiments of the present disclosure.

FIG. 7B shows another exemplary communication system in accordance with various embodiments of the present disclosure. The system includes a telecommunication network 740, such as a 3GPP-type cellular network, which comprises an access network 741, such as an gNB-RAN, and a core network 744 (e.g., 5GC). The access network 741 comprises a plurality of base stations 742*a*, 742*b*, 742*c*, such as gNBs or other types of wireless access points, each defining a corresponding coverage area 743*a*, 743*b*, 743*c*. Each base station 742*a*, 742*b*, 742*c* is connectable to the core network 744 over a wired or wireless connection 745. A first UE 791 located in coverage area 743*c* is configured to wirelessly connect to, or be paged by, the corresponding base station 742*c*. A second UE 792 in coverage area 743*a* is wirelessly connectable to the corresponding base station 742*a*. While a plurality of UEs 791, 792 are illustrated in this example, the disclosed embodiments are equally applicable to a situation where a sole UE is in the coverage area or where a sole UE is connecting to the corresponding base station 742.

The telecommunication network 740 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 740 and the host computer 730 may extend directly from the core network 744 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7B as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 741, the core network 744, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 742 may not or need not be informed about the past routing of an incoming downlink communication with data originating from a host computer 730 to be forwarded (e.g., handed over) to a connected UE 791. Similarly, the base station 742 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
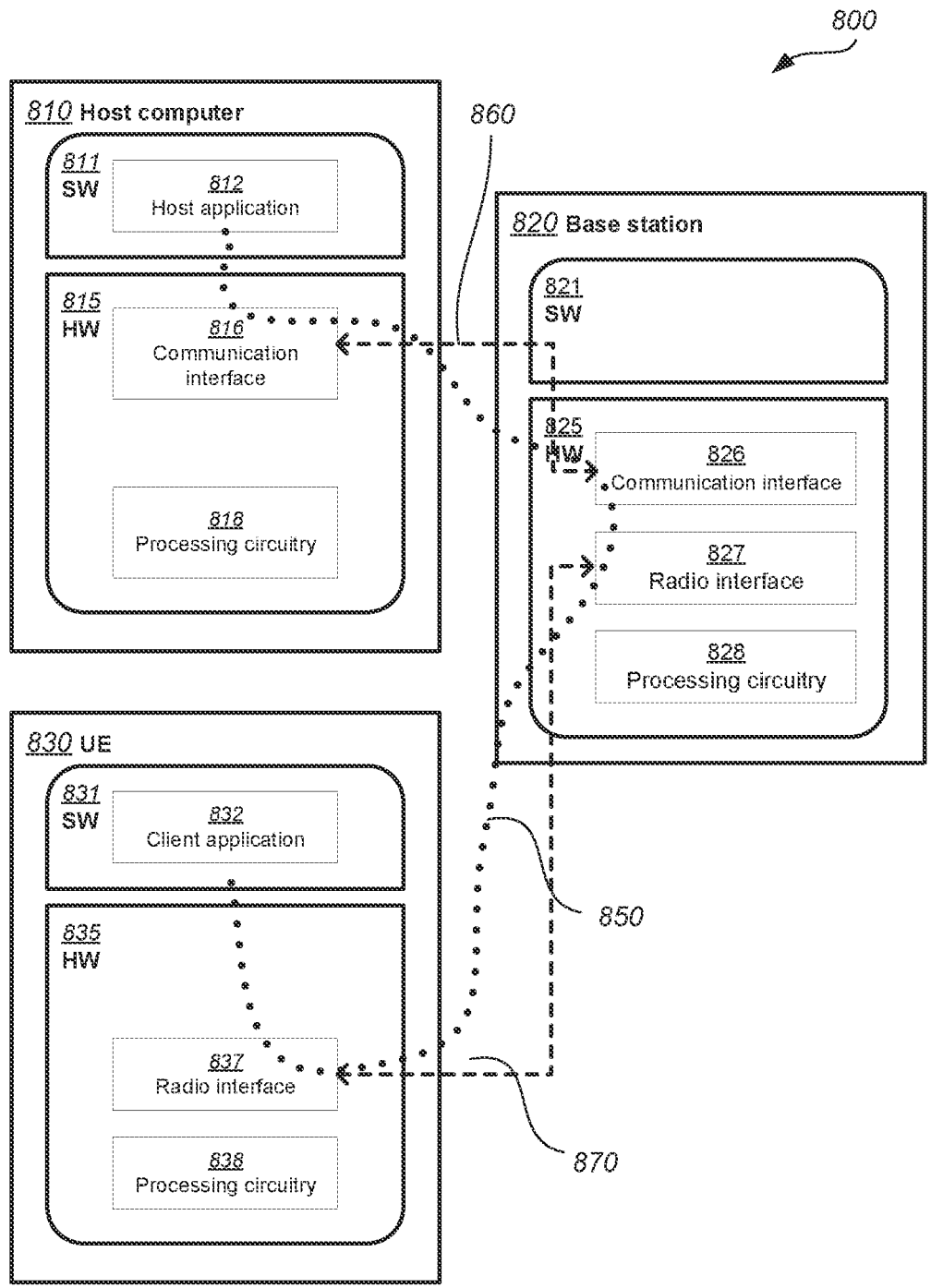
FIG. 8 is a block diagram of another exemplary communication system configurable according to various embodiments of the present disclosure.

It is noted that the host computer 810, base station 820 and UE 830 illustrated in FIG. 8 may be identical to the host computer 730, one of the base stations 712a, 712b, 712c and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further make decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the embodiments provide a flexible but efficient approach for operating a UE in a suspended state in a RAN. These embodiments manage multiple UE resources, including a plurality of timers associated with the RRC protocol, in an efficient and clearly-defined manner, thereby avoiding anomalous UE and network behavior. These embodiments provide improvements to the operation of UEs in a cellular network including, but not limited to, reducing unnecessary signaling between the UE and network; reducing power consumption of the UE and network, particularly for low-power machine-time UEs; and freeing up scarce UE and network resources to handle other important tasks, such as transmission/reception of user data. These embodiments will result in improved performance and battery life for users of the RAN.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown), the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figures 11, 12:
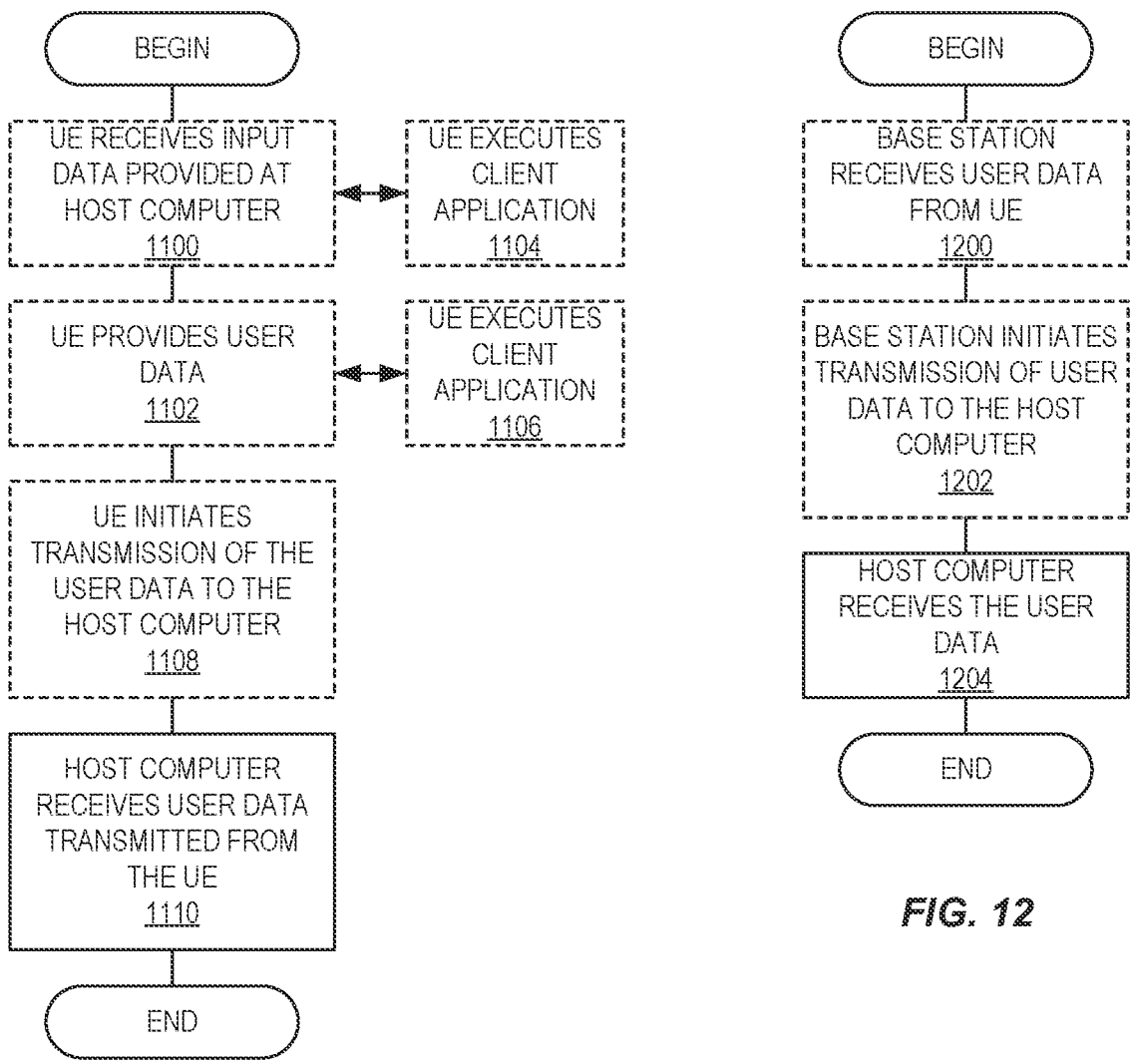

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 2010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

Figure 13:
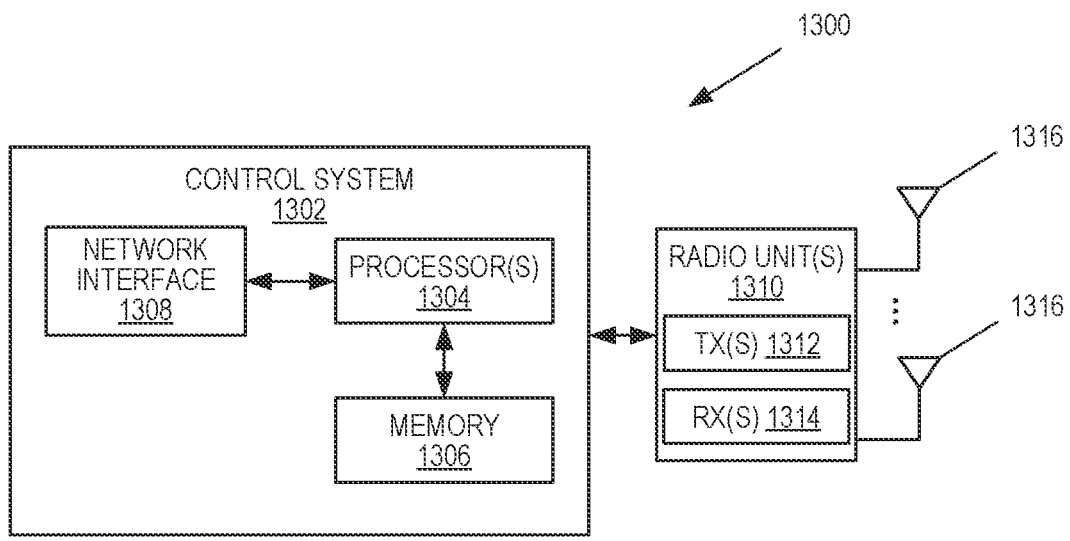
FIGS. 13-15 are block diagrams of exemplary radio access nodes configurable in various ways according to various embodiments of the present disclosure.

FIG. 13 is a schematic block diagram of a radio access node 1300 according to some embodiments of the present disclosure. The radio access node 1300 may be, for example, a base station 102 or 106. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. In addition, the radio access node 1300 includes one or more radio units 1310 that each includes one or more transmitters 1312 and one or more receivers 1314 coupled to one or more antennas 1316. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein. In some embodiments, the function(s) are implemented in software that is stored, e.g., in the memory 1306 and executed by the one or more processors 1304. Radio access node 1300 may include power supply circuitry configured to supply power to radio access node 1300.

Figure 14:
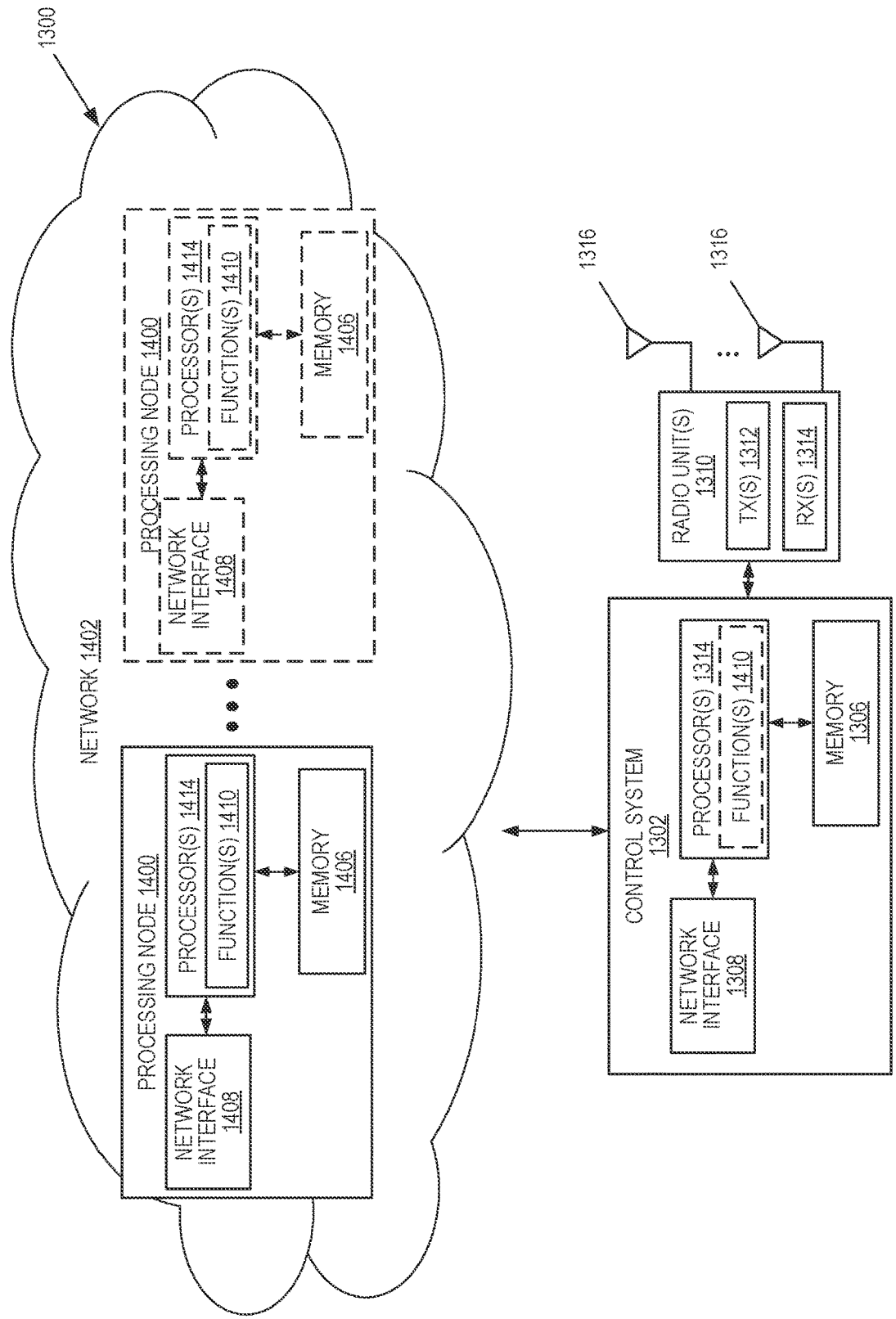

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 includes the control system 1302 that includes the one or more processors 1304 (e.g., CPUs, ASICs, FPGAs, and/or the like), the memory 1306, and the network interface 1308 and the one or more radio units 1310 that each includes the one or more transmitters 1312 and the one or more receivers 1314 coupled to the one or more antennas 1316, as described above. The control system 1302 is connected to the radio unit(s) 1310 via, for example, an optical cable or the like. The control system 1302 is connected to one or more processing nodes 1400 coupled to or included as part of a network(s) 1402 via the network interface 1308. Each processing node 1400 includes one or more processors 14014 (e.g., CPUs, ASICs, FPGAs, and/or the like), memory 1406, and a network interface 1408.

In this example, functions 1410 of the radio access node 1300 described herein are implemented at the one or more processing nodes 1400 or distributed across the control system 1302 and the one or more processing nodes 1400 in any desired manner. In some particular embodiments, some or all of the functions 1410 of the radio access node 1300 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of radio access node 1300 or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
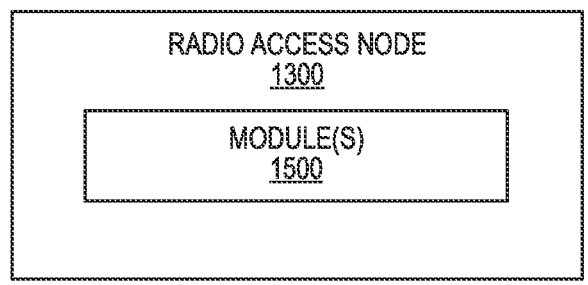

FIG. 15 is a schematic block diagram of the radio access node 1300 according to some other embodiments of the present disclosure. The radio access node 1300 includes one or more modules 1500, each of which is implemented in software. The module(s) 1500 provide the functionality of the radio access node 1300 described herein. This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
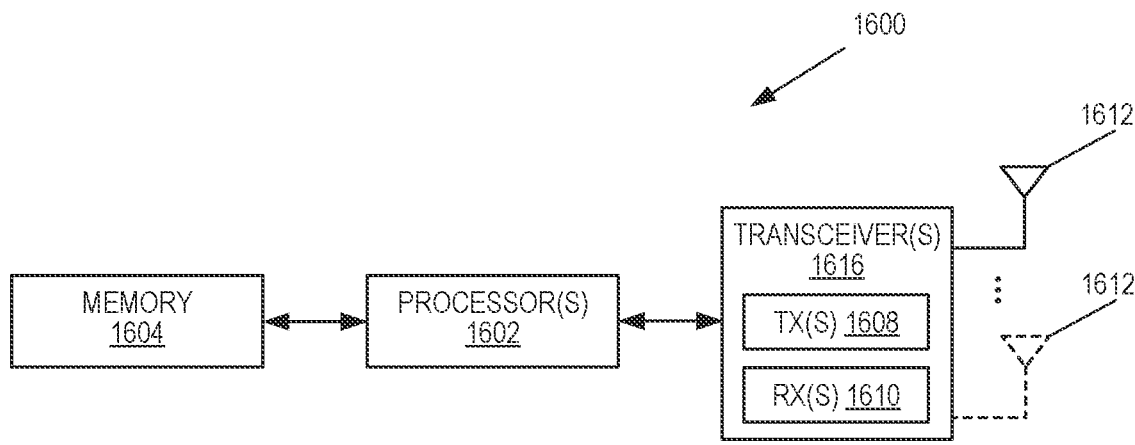
FIGS. 16-17 are block diagrams of exemplary wireless devices or UEs configurable in various ways, according to various embodiments of the present disclosure.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. In some embodiments, the functionality of the UE 1600 described above may be fully or partially implemented in software that is, e.g., stored in the memory 1604 and executed by the processor(s) 1602. UE 1600 may include power supply circuitry configured to supply power to UE 1600.

In some embodiments, a computer program including instructions which, when executed by at least one processor, causes the at least one processor to carry out the functionality of the UE 1600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
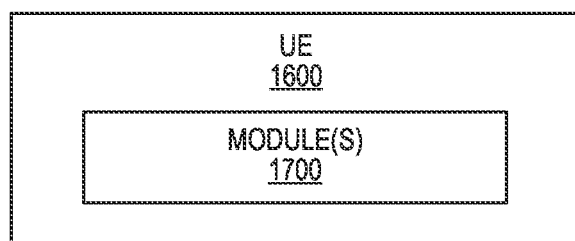

FIG. 17 is a schematic block diagram of the UE 1600 according to some other embodiments of the present disclosure. The UE 1600 includes one or more modules 1700, each of which is implemented in software. The module(s) 1700 provide the functionality of the UE 1600 described hereinabove.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

What is claimed is:

1. A method of operating a user equipment (UE) in a suspended state in a radio access network (RAN) the method comprising:
   in response to expiration of a first timer, transmitting an RRCResumeRequest message;
   receiving, in response to the RRCResumeRequest message, a reject message;
   in response to the reject message, starting a second timer; and
   subsequently transmitting a further RRCResumeRequest message, in response to one of:
      expiration of a re-started first timer;
      expiration of the second timer;
      cell reselection; and
      availability of data for transmission.

2. The method of claim 1, wherein the first timer is associated with a periodic RAN notification area update (RNAU).

3. The method of claim 1, wherein the reject message is one of: an RRCSetup message, an RRCRelease message, an RRCSuspend message, and an RRCReject message.

4. The method of claim 1, wherein the RRCResumeRequest message comprises a cause value indicating a cause of RAN notification area update.

5. The method of claim 1, further comprising, in response to the reject message, restarting the first timer, wherein:
   the first timer is restarted using a first stored value; and
   the second timer is started using a second stored value.

6. The method of claim 5, wherein:
   the first stored value is greater than the second stored value; and
   the transmitting of the further RRCResumeRequest message is in response to one of:
      expiration of the second timer and the restarted first timer; and
      expiration of the second timer and another event prior to expiration of the restarted first timer, the other event being cell reselection or availability of data for transmission.

7. The method of claim 5, wherein:
   the first stored value is less than the second stored value; and
   the transmitting of the further RRCResumeRequest message is in response to expiration of the re-started first timer and an access-control configuration that enables the UE to transmit the further RRCResumeRequest prior to expiration of the second timer.

8. The method of claim 5, further comprising restarting the first timer in response to the reject message comprising an indication that the UE's context is stored by the network.

9. The method of claim 1, further comprising, in response to the reject message, stopping the first timer.

10. The method of claim 9, wherein the transmitting of the further RRCResumeRequest message is in response to:
    expiration of the second timer.

11. The method of claim 9, wherein the transmitting of the further RRCResumeRequest message is in response to an event prior to expiration of the restarted second timer, wherein the event comprises one of cell reselection and availability of data for transmission.

12. The method of claim 1, further comprising, in response to the reject message, setting a periodic RNAU as a pending notification.

13. The method of claim 12, further comprising setting the periodic RNAU as a pending notification in response to the reject message comprising an indication that a context for the UE is stored by the network.

14. The method of claim 1, further comprising incrementing a counter upon reception of the reject message, wherein incrementing the counter comprises incrementing a particular counter associated with a particular cause value associated with the RRCResumeRequest message.

15. The method of claim 14, wherein the RRCResumeRequest message includes the particular cause value.

16. The method of claim 14, further comprising:
    comparing the value of the incremented counter to a predetermined threshold; and
    in response to the value of the incremented counter being greater than or equal to the predetermined threshold, discarding a context associated with the UE; and
    wherein said transmitting the further RRCResumeRequest message comprises transmitting the further RRCResumeRequest in response to the value of the of the incremented counter being greater than or equal to the predetermined threshold and further upon one of expiration of the second timer and cell reselection.

17. The method of claim 1, further comprising setting a value of a periodic RNAU pending register to "true" in response to receiving the reject message.

18. A wireless device configurable for operating in a suspended state in a radio access network (RAN) the wireless device comprising:
 radio front-end circuitry; and
 processing circuitry operably coupled to the radio front-end circuitry and configured to use the radio front-end circuitry to:
  in response to expiration of a first timer, transmit an RRCResumeRequest message;
  receive, in response to the RRCResumeRequest message, a reject message;
  in response to the reject message, starting a second timer; and
 subsequently transmit a further RRCResumeRequest message in response to one of:
  expiration of a re-started first timer;
  expiration of the second timer;
  cell reselection; and
  availability of data for transmission.

\* \* \* \* \*

UNITED STATES PATENT AND TRADEMARK OFFICE
CERTIFICATE OF CORRECTION

PATENT NO. : 11,889,577 B2
APPLICATION NO. : 18/095186
DATED : January 30, 2024
INVENTOR(S) : Da Silva et al.

Page 1 of 4

It is certified that error appears in the above-identified patent and that said Letters Patent is hereby corrected as shown below:

On the Title Page

In Column 1, below "Related U.S. Application Data", delete Item "(60)" and insert Item -- (63) --, therefor.

In Item (56), under "OTHER PUBLICATIONS", in Column 2, Line 1, delete "3GPP ," and insert -- 3GPP, --, therefor.

On Page 2, in Item (56), under "OTHER PUBLICATIONS", in Column 2, Line 1, delete "3GPP ," and insert -- 3GPP, --, therefor.

On Page 2, in Item (56), under "OTHER PUBLICATIONS", in Column 2, Line 5, delete "3GPP ," and insert -- 3GPP, --, therefor.

On Page 2, in Item (56), under "OTHER PUBLICATIONS", in Column 2, Line 9, delete "Fasil ," and insert -- Fasil, --, therefor.

On Page 2, in Item (56), under "OTHER PUBLICATIONS", in Column 2, Line 11, delete "Evelina ," and insert -- Evelina, --, therefor.

On Page 2, in Item (56), under "OTHER PUBLICATIONS", in Column 2, Line 14, delete "Author ," and insert -- Author, --, therefor.

On Page 2, in Item (56), under "OTHER PUBLICATIONS", in Column 2, Line 17, delete "Author ," and insert -- Author, --, therefor.

On Page 2, in Item (56), under "OTHER PUBLICATIONS", in Column 2, Line 20, delete "Author ," and insert -- Author, --, therefor.

On Page 2, in Item (56), under "OTHER PUBLICATIONS", in Column 2, Line 23, delete "Author ,"

Signed and Sealed this
Sixteenth Day of July, 2024

Katherine Kelly Vidal
*Director of the United States Patent and Trademark Office* and insert -- Author, --, therefor.

On Page 2, in Item (56), under "OTHER PUBLICATIONS", in Column 2, Line 26, delete "Author ," and insert -- Author, --, therefor.

On Page 2, in Item (56), under "OTHER PUBLICATIONS", in Column 2, Line 29, delete "Author ," and insert -- Author, --, therefor.

On Page 2, in Item (56), under "OTHER PUBLICATIONS", in Column 2, Line 32, delete "Author ," and insert -- Author, --, therefor.

On Page 2, in Item (56), under "OTHER PUBLICATIONS", in Column 2, Line 35, delete "Jincan ," and insert -- Jincan, --, therefor.

On Page 2, in Item (56), under "OTHER PUBLICATIONS", in Column 2, Line 38, delete "Author ," and insert -- Author, --, therefor.

In the Drawings

Figure 2A:
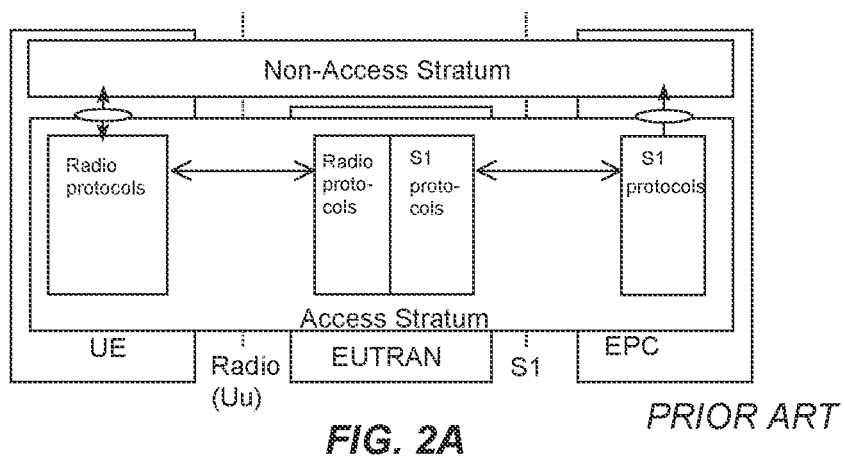
FIG. 2A is a high-level block diagram of an exemplary E-UTRAN architecture in terms of its constituent components, protocols, and interfaces.
Figure 2B:
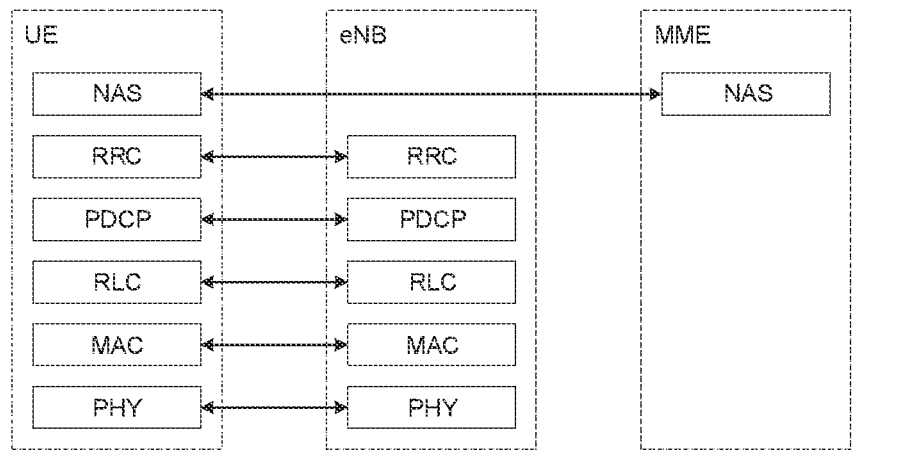
FIG. 2B is a block diagram of exemplary protocol layers of the control-plane portion of the radio (Uu) interface between a UE and the E-UTRAN.
Figure 2C:
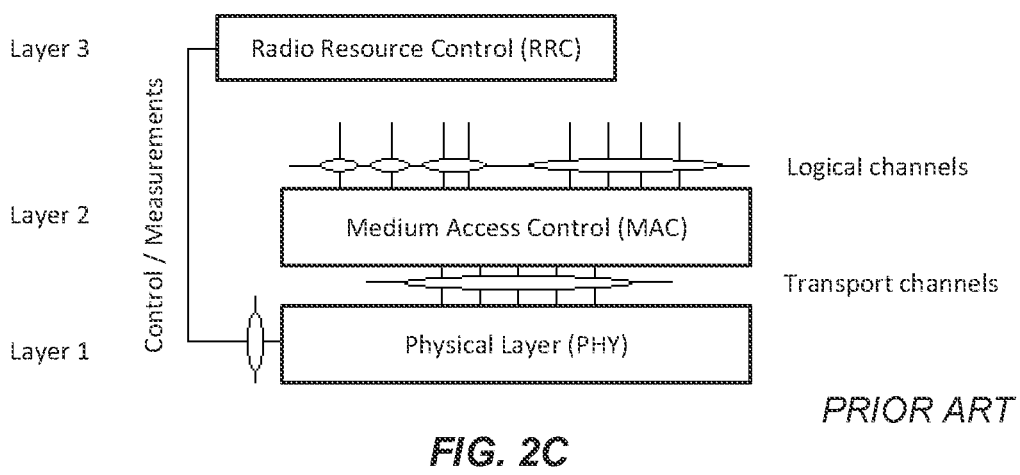
FIG. 2C is a block diagram of an exemplary LTE radio interface protocol architecture from the perspective of the PHY layer.
Figure 3A:
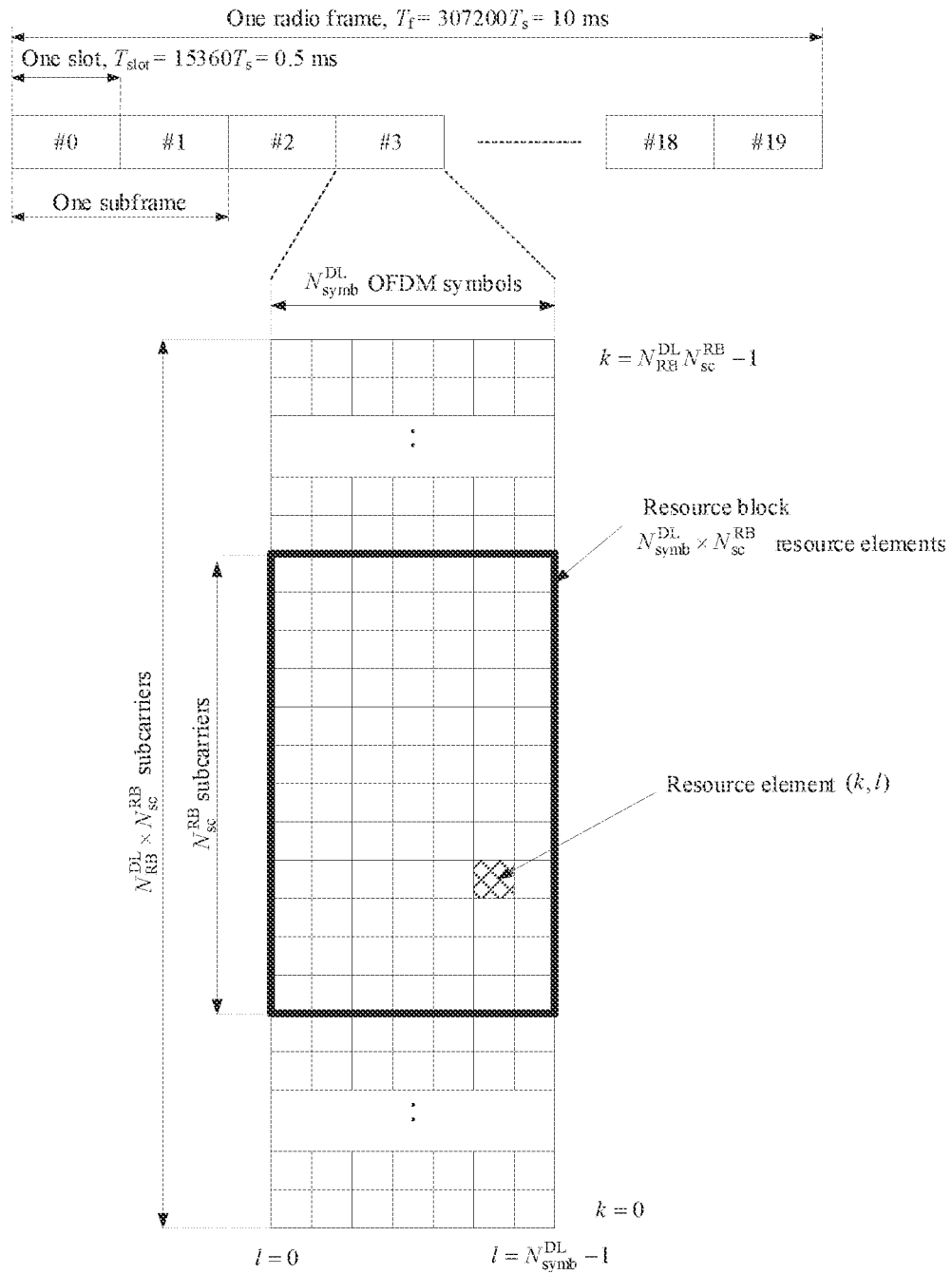
FIGS. 3A and 3B are block diagrams of exemplary downlink and uplink, respectively, LTE radio frame structures used for FDD operation.
Figure 3B:
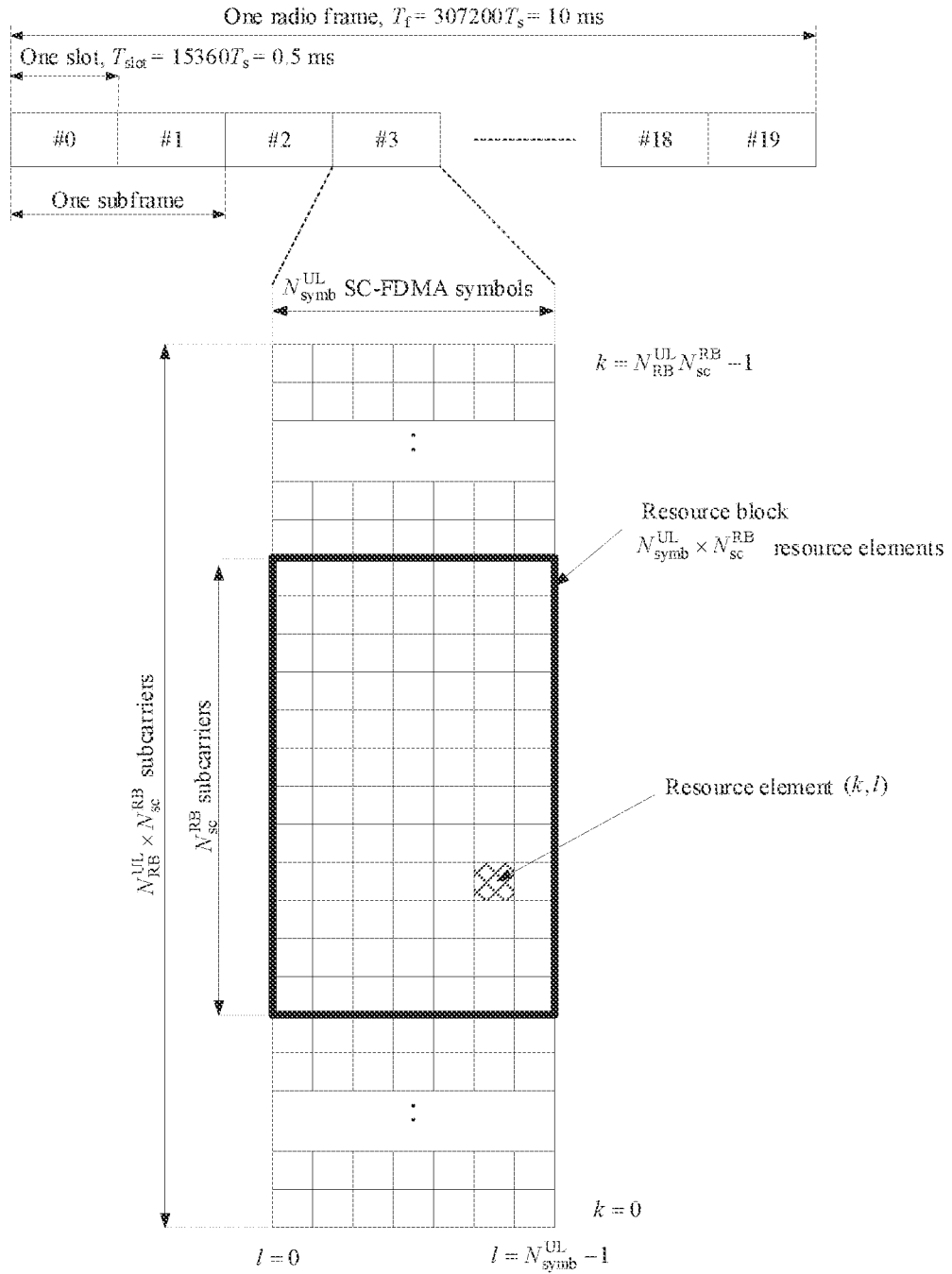
Figure 4:
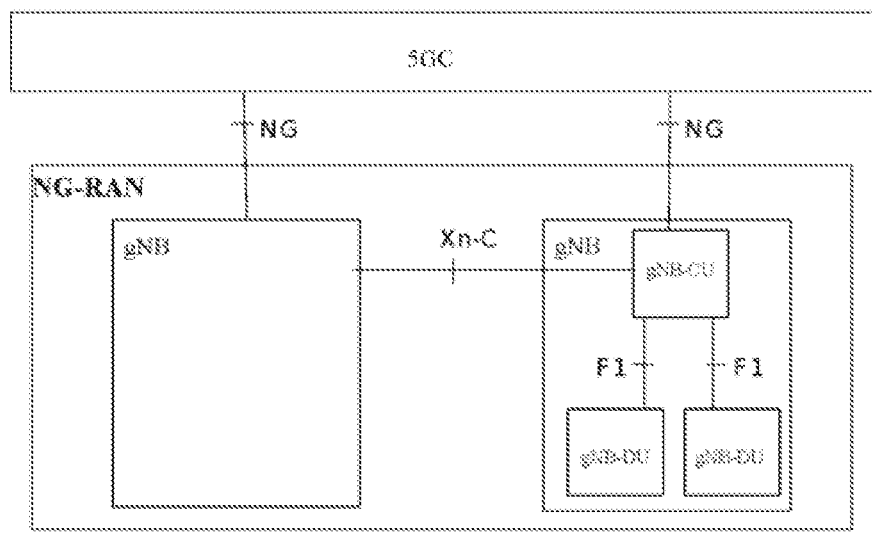
FIG. 4 shows a block diagram of an exemplary 5G logical network architecture.
Figure 5A:
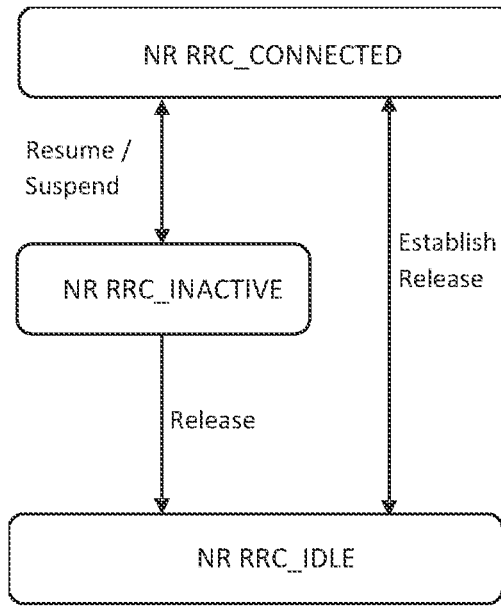
FIGS. 5A-B show an exemplary state transition diagram and exemplary flow diagram, respectively, showing possible transitions between RRC states in NR.
Figure 5B:
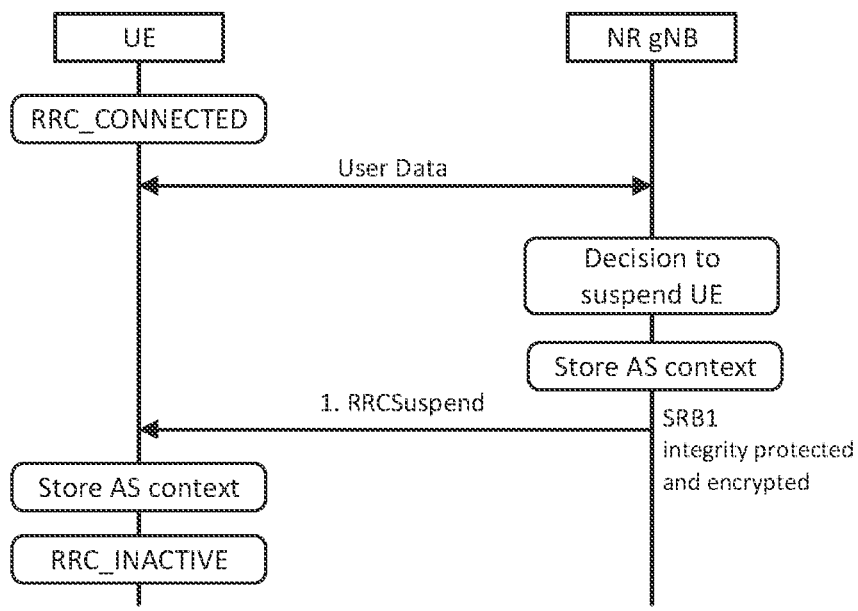
Figure 6D:
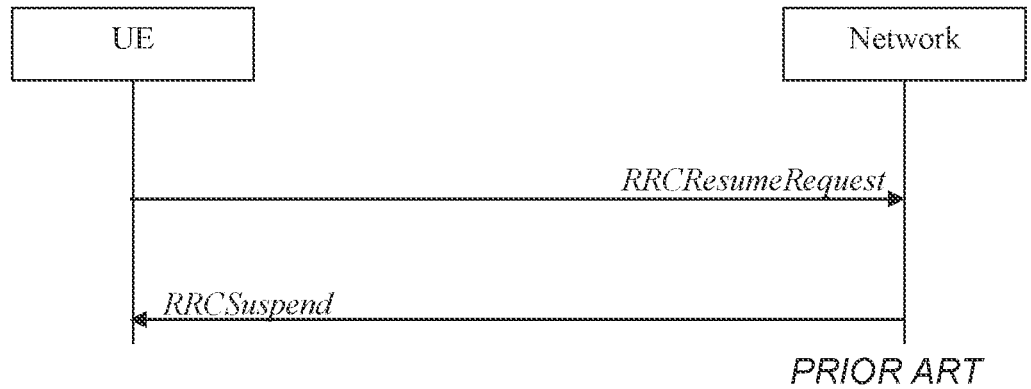
Figure 6E:
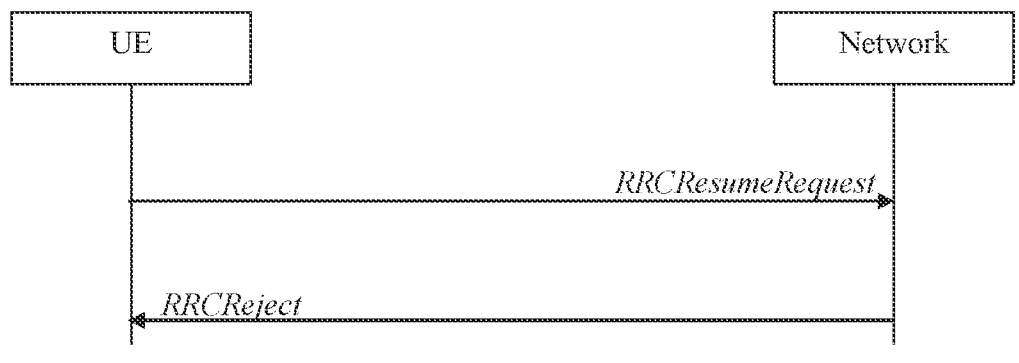

In Fig. 2A, Sheet 2 of 19, delete "EUTRAN" and insert -- E-UTRAN --, therefor.

In Fig. 19, Sheet 18 of 19, and on the title page, the illustrative print figure, for Tag "1920", Line 2, delete "messaged" and insert -- message --, therefor.

In the Specification

In Column 1, Line 30, delete "requirement on" and insert -- requirement of --, therefor.

In Column 1, Line 58, delete "third-("3G")" and insert -- third-generation ("3G") --, therefor.

In Column 2, Line 1, delete "Interface," and insert -- interface, --, therefor.

In Column 2, Line 26, delete "is carries" and insert -- carries --, therefor.

In Column 3, Line 31, delete "1-ms" and insert -- 1 ms --, therefor.

In Column 4, Line 30, delete "10-5" and insert -- $10^{-5}$ --, therefor.

In Column 4, Line 53, delete "interchangeability.)" and insert -- interchangeably.) --, therefor.

In Column 5, Line 6, delete "splits that by" and insert -- splits by --, therefor.

In Column 5, Line 28, delete "RRCConnectionResume is" and insert -- RRCConnectionResume message is --, therefor.

In Column 7, Line 4, delete "ma-update')." and insert -- rna-update'). --, therefor.

CERTIFICATE OF CORRECTION (continued)
U.S. Pat. No. 11,889,577 B2

In Column 7, Line 43, delete "'ma-update'" and insert -- 'rna-update' --, therefor.

In Column 7, Line 47, delete "handing" and insert -- handling --, therefor.

In Column 7, Lines 55-56, delete "RRCResumeResquest" and insert -- RRCResumeRequest --, therefor.

In Column 12, Line 38, delete "Various exemplary embodiments are described" and insert the same on Line 39 before "herein as methods," as a new paragraph.

In Column 13, Line 3, delete "only upon" and insert -- only --, therefor.

In Column 13, Line 6, delete "handing" and insert -- handling --, therefor.

In Column 13, Line 22, delete "unsecure" and insert -- unsecured --, therefor.

In Column 13, Line 67, delete "running" and insert -- running. --, therefor.

In Column 14, Line 51, delete "handing" and insert -- handling --, therefor.

In Column 14, Lines 60-61, delete "RRCResumeResquest" and insert -- RRCResumeRequest --, therefor.

In Column 15, Line 66, delete "RANU" and insert -- RNAU --, therefor.

In Column 16, Line 44, delete "second timer." and insert -- second timer (block 2020). --, therefor.

In Column 19, Line 3, delete "core network 770." and insert -- core network 710. --, therefor.

In Column 21, Line 19, delete "use equipment" and insert -- user equipment --, therefor.

In Column 21, Line 22, delete "which it" and insert -- which --, therefor.

In Column 22, Line 2, delete "etc.; the" and insert -- etc. The --, therefor.

In Column 22, Line 9, delete "in that" and insert -- such that --, therefor.

In Column 22, Line 59, delete "first step 2010," and insert -- first step 1110, --, therefor.

In Column 22, Line 65, delete "substep" and insert -- step --, therefor.

In Column 23, Lines 66-67, delete "network interface 1308." and insert -- network interface 1408. --, therefor.

In Column 24, Line 1, delete "processors 14014" and insert -- processors 1414 --, therefor.

In Column 24, Line 47, delete "transceivers 1606" and insert -- transceivers 1616 --, therefor.

In Column 25, Line 25, delete "according" and insert -- according to --, therefor.

In the Claims

In Column 26, Line 61, in Claim 16, delete "UE; and" and insert -- UE; --, therefor.